United States Patent
Reicher et al.

(10) Patent No.: US 10,127,662 B1
(45) Date of Patent: Nov. 13, 2018

(54) SYSTEMS AND USER INTERFACES FOR AUTOMATED GENERATION OF MATCHING 2D SERIES OF MEDICAL IMAGES AND EFFICIENT ANNOTATION OF MATCHING 2D MEDICAL IMAGES

(71) Applicant: D.R. Systems, Inc., San Diego, CA (US)

(72) Inventors: Murray A. Reicher, Rancho Santa Fe, CA (US); Evan K. Fram, Paradise Valley, AZ (US)

(73) Assignee: D.R. Systems, Inc., San Diego, CA (US)

(*) Notice: Subject to any disclaimer, the term of this patent is extended or adjusted under 35 U.S.C. 154(b) by 313 days.

(21) Appl. No.: 14/818,167

(22) Filed: Aug. 4, 2015

Related U.S. Application Data

(60) Provisional application No. 62/036,041, filed on Aug. 11, 2014, provisional application No. 62/095,657, (Continued)

(51) Int. Cl.
*G06T 7/00* (2017.01)
*G06F 17/30* (2006.01)

(52) U.S. Cl.
CPC ...... *G06T 7/0014* (2013.01); *G06F 17/30247* (2013.01); *G06F 17/30528* (2013.01);
(Continued)

(58) Field of Classification Search
CPC .............................. G06F 19/30; G06T 7/0016
See application file for complete search history.

(56) References Cited

U.S. PATENT DOCUMENTS 6,081,612 A    6/2000  Gutkowicz-Krusin et al.
7,672,495 B2   3/2010  Evertsz et al.
(Continued)

OTHER PUBLICATIONS

AGFA HealthCare, color brochure "IMPAX 6: Digital Image and Information Management," © 2012 Agfa HealthCare N.V. Downloaded from http://www.agfahealthcare.com/global/en/he/library/libraryopen?ID 32882925. Accessed on Feb. 9, 2015.
(Continued)

*Primary Examiner* — Avinash Yentrapati
(74) *Attorney, Agent, or Firm* — Michael Best & Friedrich LLP

(57) ABSTRACT

A system is disclosed by which medical imaging exams may be matched and/or registered so as to reduce and/or substantially eliminate artifactual differences between 2D images of the exams. The system may automatically create new, matching 2D images such that two or more exams may be accurately and efficiently compared by a reading physician. The new, matching 2D images may be generated by automated 3D registration of the exams and/or multiplanar reformation of 3D volumetric data acquired during acquisition of one or both exams (e.g., during imaging scans). Rules may be used to automatically determine exams to be compared, and which exams to match to another. Additionally, the system may automatically add indications to a later acquired image that indicate a corresponding earlier acquired image includes annotations. Additionally, the system may allow the physician to easily add and modify similar annotations to the later acquired image by selection of the indications.

24 Claims, 16 Drawing Sheets

Related U.S. Application Data filed on Dec. 22, 2014, provisional application No. 62/112,922, filed on Feb. 6, 2015.

(52) U.S. Cl.
CPC ............... *G06T 2207/10076* (2013.01); *G06T 2207/10088* (2013.01); *G06T 2207/30016* (2013.01)

(56) References Cited

U.S. PATENT DOCUMENTS

| | | | |
|---|---|---|---|
| 7,894,646 B2 | 2/2011 | Shirahata et al. | |
| 8,094,901 B1* | 1/2012 | Reicher | G06F 19/321 |
| | | | 382/128 |
| 9,378,331 B2 | 6/2016 | Reicher et al. | |
| 2001/0043729 A1* | 11/2001 | Giger | G06F 19/321 |
| | | | 382/128 |
| 2002/0028006 A1 | 3/2002 | Novak et al. | |
| 2002/0065460 A1 | 5/2002 | Murao | |
| 2003/0016850 A1 | 1/2003 | Kaufman et al. | |
| 2005/0147284 A1 | 7/2005 | Vining et al. | |
| 2006/0034521 A1 | 2/2006 | Lindmark | |
| 2006/0061595 A1* | 3/2006 | Goede | G06F 17/241 |
| | | | 345/619 |
| 2006/0093198 A1* | 5/2006 | Fram | A61B 6/463 |
| | | | 382/128 |
| 2006/0095423 A1* | 5/2006 | Reicher | G06F 19/3418 |
| 2006/0106642 A1* | 5/2006 | Reicher | G06F 19/321 |
| | | | 705/2 |
| 2007/0106633 A1* | 5/2007 | Reiner | G06F 19/321 |
| 2008/0228061 A1 | 9/2008 | Habets | |
| 2009/0076379 A1 | 3/2009 | Hamill | |
| 2009/0182577 A1* | 7/2009 | Squilla | G06Q 10/06 |
| | | | 705/2 |
| 2009/0213034 A1* | 8/2009 | Wu | G06F 19/321 |
| | | | 345/1.1 |
| 2010/0156898 A1 | 6/2010 | Voros et al. | |
| 2010/0226550 A1 | 9/2010 | Miyasa et al. | |
| 2010/0284590 A1 | 11/2010 | Peng | |
| 2010/0293164 A1* | 11/2010 | Weese | G06F 17/30265 |
| | | | 707/737 |
| 2011/0145693 A1 | 6/2011 | Mutic | |
| 2011/0170755 A1 | 7/2011 | Buelow | |
| 2011/0182493 A1* | 7/2011 | Huber | G16H 15/00 |
| | | | 382/132 |
| 2011/0243402 A1 | 11/2011 | Kadir | |
| 2011/0295118 A1 | 12/2011 | Okamura | |
| 2012/0008838 A1 | 1/2012 | Guyon et al. | |
| 2012/0130223 A1* | 5/2012 | Reicher | G06F 19/321 |
| | | | 600/407 |
| 2012/0154431 A1* | 6/2012 | Fram | G06F 3/0338 |
| | | | 345/619 |
| 2017/0046498 A1 | 2/2017 | Reicher | |
| 2017/0200064 A1* | 7/2017 | Reicher | G06K 9/6267 |
| 2017/0200269 A1* | 7/2017 | Reicher | G06T 7/0012 |

OTHER PUBLICATIONS

AGFA HealthCare, IMPAX 6.5 Datasheet (US)2012. © 2012 Agfa HealthCare N.V. Downloaded from http://www.agfahealthcare.com/global/en/he/library/libraryopen?ID=37459801. Accessed on Feb. 9, 2015.
AMD Technologies, Inc., Catella PACS 5.0 Viewer User Manual (112 pgs), © 2010, AMD Technologies, Inc. (Doc. 340-3-503 Rev. 01). Downloaded from http://amdtechnologies.com/lit/cat5viewer.pdf. Accessed on Feb. 9, 2015.
AVREO, interWorks—RIS/PACS package, 2 page color brochure, © 2014, Avreo, Inc. (Document MR-5032 Rev. 4). Downloaded from http://www.avreo.com/ProductBrochures/MR-5032Rev.%204interWORKS%20RISPACSPackage.pdf. Accessed on Feb. 9, 2015.
Cerner, Radiology—Streamline image management, 2 page color brochure, (fl03_332_10_v3). Downloaded from http://www.cerner.com/uploadedFiles/Clinical_Imaging.pdf. Accessed on Feb. 9, 2015.
iCRco, I See The Future, in 12 pages, color brochure, (BR080809AUS), © 2009 iCRco.ClarityPACS. Downloaded from http://www.claritypacs.com/pdfs/ISeeFuture_26_Web.pdf. Accessed on Feb. 9, 2015.
Intelerad, IntelePACS, 2 page color brochure, © 2014 Intelerad Medical Systems Incoprorated. Downloaded http://www.intelerad.com/wp-content/uploads/sits/2/2014/08/intelePACS-brochure.pdf. Accessed on Feb. 9, 2015.
Intelerad, InteleViewer, 2 page color brochure, © 2014 Intelerad Medical Systems Incoprorated. Downloaded from http://www.intelerad.com/wp-content/uploads/sites/2/2014/09/inteleViewer-brochure.pdf. Accessed on Feb. 9, 2015.
Medweb Radiology Workflow Solutions, Radiology Workflow Solutions, Complete Workflow & Flexible Turnkey Solutions, Web RIS/PACS with Advanced Viewer, 3 page color brochure, © 2006-2014 Medweb. Downloaded from http://www.medweb.com/docs/rispacs_brochure_2014.pdf. Accessed on Feb. 9, 2015.
PACSPLUS, PACSPLUS Server, 1 page (color) printout. Accessed at http://www.pacsplus.com/01_products/products_01.html. Accessed on Feb- 9, 2015.
PHILIPS IntelliSpace PACS, in 2 color page printout. Accessed at https://www.healthcare.phillips.com/main/products/healthcare_informatics/products/enterprise_imaging_informatics/isite_pacs. Accessed on Feb. 9, 2015.
Sclmage, Cardiology PACS, in 8 color page printout. Accessed at http://www.scimage.com/solutions/clinical-solutions/cadiology. Accessed on Feb. 9 2015.
Siemens syngo.plaza, Features and Benefits, in 2 color page printout. Accessed at http://www.healthcare.siemens.com/medical-imaging-it/imaging-it-radiology-image-managment-pacs/syngoplaza/features. Accessed on Feb. 9, 2015.
Stryker, OfficePACS Power—Digital Imaging, 8 page color brochure, (MPP-022 Rev 4 BC/MP 300 Jan. 2007),© 007 Stryker. Downloaded from http://www.stryker.com/emea-Solutions/imaging/OfficePACSPowerDigitalimaging/ssLINK/emea/1557/022268. Accessed on Feb. 9, 2015.
UltraRAD—ultra VISION, 1 page (color). Downloaded from http://www.ultradcorp.com/pdf/UltraVISION.pdf. Accessed on Feb. 9, 2015.
VioStream for VitreaView, 2 color page printout. Accessed at http://www.vitaimages.com/solutions.com/solutions/universial-viewing/viostream-for-vitreaview. Accessed on Feb. 9, 2015.
VIZTEK Radiology PACS Software Vixtek Opal-RAD, 4 color page printout. Accessed at http://viztek.net/products/opai-rad. Accessed on Feb. 9, 2015.
Voyager Imaging—Voyager PACS Radiologist Workstation, 2 page color brochure. Downloaded from http://www.intellirad.com.au/assets/Uploads/Voyager-PacsWorkstations.pdf?. Accessed on Feb. 9, 2015.
Notice of Allowance dated Feb. 29, 2016, in U.S. Appl. No. 13/300,239.
Notice of Allowance dated Jan. 16, 2015, in U.S. Appl. No. 13/300,239.
Office Action dated Aug. 14, 2014, in U.S. Appl. No. 13/300,239.
Office Action dated Aug. 15, 2013, in U.S. Appl. No. 13/300,239.
Restriction Requirement dated Jun. 10, 2013, in U.S. Appl. No. 13/300,239.
Office Action dated Jan. 30, 2017, in U.S. Appl. No. 15/163,316.
Interview Summary dated Jul. 27, 2017, in U.S. Appl. No. 15/163,316.
Office Action dated Aug. 1, 2017, in U.S. Appl. No. 15/163,316.
AGFA HealthCare, color brochure "IMPAX 6: Digital Image and Information Management," ©2012 Agfa HealthCare N.V. Downloaded from http://www.agfahealthcare.com/global/en/he/library/libraryopen?ID=32882925. Accessed on Feb. 9, 2015.
AGFA HealthCare, IMPAX 6.5 Datasheet (US)2012. ©2012 Agfa HealthCare N.V. Downloaded from http://www.agfahealthcare.com/global/en/he/library/libraryopen?ID=37459801. Accessed on Feb. 9, 2015.

(56) References Cited

OTHER PUBLICATIONS

AMD Technologies, Inc., Catella PACS 5.0 Viewer User Manual (112 pgs), © 2010, AMD Technologies, Inc. (Doc. 340-3-503 Rev. 01). Downloaded from http://www.amdtechnologies.com/lit/cat5viewer.pdf. Accessed on Feb. 9, 2015.
ASPYRA's Imaging Solutions, 3 page color print out. Accessed at http://www.aspyra.com/imaging-solutions. Accessed on Feb. 9, 2015.
AVREO, interWorks—RIS/PACS package, 2 page color brochure, © 2014, Avreo, Inc. (Document MR-5032 Rev. 4). Downloaded from http://www.avreo.corn/ProductBrochures/MR-5032Rev.%204interWORKS%20RISPACSPackage.pdf. Accessed on Feb. 9, 2015.
BRIT Systems, BRIT PACS View Viewer, 2 page color brochure, (BPB-BPV-0001). Downloaded from http://www.brit.com/pdfs/britpacsview.pdf. Accessed on Feb. 9, 2015.
BRIT Systems, Roentgen Works—100% Browers-based VNA (Vendor Neutral Archive/PACS), © 2010 BRIT Systems, 1 page color sheet. Accessed at http://www.roentgenworks.com/PACS. Accessed on Feb. 9, 2015.
BRIT Systems, Vision Multi-modality Viewer—with 3D, 2 page color brochure, (BPB-BVV-0001 REVC). Downloaded from http://www.brit.com/pdfs/BPB-BVV-0001REVC_BRIT_Vision_Viewer.pdf. Accessed on Feb. 9, 2015.
CANDELiS, ImageGrid™: Image Management Appliance, 6 page color brochure. (AD-012 Rev. F Nov. 2012), © 2012 Candelis, Inc. Downloaded from http://www.candelis.com/images/pdf/Candelis_ImageGrid_Appliance_20111121.pdf. Accessed on Feb. 9, 2015.
Carestream, Cardiology PACS, 8 page color brochure. (CAT 866 6075 Jun. 2012). © Carestream Health, Inc., 2012. Downloaded from http://www.carestream.com/cardioPACS_brochure_M1-877.pdf. Accessed on Feb. 9, 2015.
Carestream, Vue PACS, 8 page color brochure. (CAT 300 1035 May 2014). © Carestream Health, Inc., 2014. Downloaded from http://www.carestream.com/csPACS_brochure_M1-876.pdf. Accessed on Feb. 9, 2015.
Cerner, Radiology—Streamline image management, 2 page color brochure, (fl03_332_10_v3). Downloaded from http://www.cerner.com/unloadedFiles/Clinical_Imaging.pdf. Accessed on Feb. 9, 2015.
CoActiv, EXAM-PACS, 2 page color brochure, © 2014 CoActiv, LLC. Downloaded from http://coactiv.com/wp-content/uploads/2013/08/EXAM-PACS-BROCHURE-final-web.pdf. Accessed on Feb. 9, 2015.
DR Systems, Dominator™ Guide for Reading Physicians, Release 8.2, 546 pages, (TCP-000260-A), © 1997-2009, DR Systems, Inc. Downloaded from https://resources.dominator.com/assets/004/6999.pdf. Document accessed Feb. 9, 2015.
DR Systems, DR Scheduler User Guide, Release 8.2, 410 pages, (TCP-000115-A), © 1997-2009, DR Systems, Inc. Downloaded from https://resources.dominator.com/assets/003/6850.pdf. Document accessed Feb. 9, 2015.
Fujifilm Medical Systems, SYNAPSE® Product Data, Synapse Release Version 3.2.1, Foundation Technologies, 4 page color brochure, (XBUSSY084) Aug. 2008. Downloaded from http://www.fujifilmusa.com/shared/bin/foundation.pdf. Accessed on Feb. 9, 2015.
Fujifilm Medical Systems, SYNAPSE® Product Data, Synapse Release Version 3.2.1, Server Modules and Interfaces, 4 page color brochure, (XBUSSY085) Aug. 2008. Downloaded from http://www.fujifilmusa.com/shared/bin/server-interface.pdf. Accessed on Feb. 9, 2015.
Fujifilm Medical Systems, SYNAPSE® Product Data, Synapse Release Version 3.2.1, Workstation Software, 4 page color brochure, (XBUSSY082) Aug. 2008. Downloaded from http://www.fujifilmusa.com/shared/bin/workstation.pdf. Accessed on Feb. 9, 2015.
GE Healthcare, Centricity PACS, in 8 page printout. Accessed at http://www3.gehealthcare.com/en/products/categories/healthcare_it/medical_imaging_informatics_-_ris-pacs-cvis/centricity_pacs. Accessed on Feb. 9, 2015.
Handylife.com—Overview of Handy Patients Enterprise, in 2 page printout. Accessed from http://www.handylife.com/en/software/overview/html. Accessed on Feb. 18, 2015.
Handylife.com—Features of Handy Patients Enterprise, in 4 page printout. Accessed from http://www.handylife.com/en/software/features.html. Accessed on Feb. 18, 2015.
Handylife.com—Screenshots of Handy Patients Enterprise, in 2 page printout. Accessed from http://www.handylife.com/en/software/screenshots.html. Accessed on Feb. 18, 2015.
iCRco, I See the Future, in 12 pages, color brochure, (BR080809AUS), © 2009 iCRco.ClarityPACS. Downloaded from http://claritypacs.com/pdfs/ISeeFuture_26_Web.pdf. Accessed on Feb. 9, 2015.
Imageanalysis, dynamika, 2 page color brochure. Downloaded from http://www.imageanalysis.org.uk/what-we-do. Accessed on Feb. 9, 2015.
Imageanalysis, MRI Software, in 5 page printout. Accessed at http://www.imageanalysis.org.uk/mri-software. Accessed on Feb. 9, 2015.
IMSI, Integrated Modular Systems, Inc., Hosted / Cloud PACS in one page printout. Accessed at http://www.imsimed.com/#!products-services/ctnu. Accessed on Feb. 9, 2015.
Infinitt, PACS, RIS, Mammo PACS, Cardiology Suite and 3D/Advanced Visualization | Infinittna, 2 page printout. Accessed at http://www.infinittna.com/products/radiology/radiology-pacs. Accessed on Feb. 9, 2015.
Intelerad, IntelePACS, 2 page color brochure, © 2014 Intelerad Medical Systems Incoprorated. Downloaded http://www.intelerad.com/wp-content/uploads/sites/2/2014/08/IntelePACS-brochure.pdf. Accessed on Feb. 9, 2015.
Intelerad, InteleViewer, 2 page color brochure, © 2014 Intelerad Medical Systems Incoprorated. Downloaded from http://www.interlard.com/wp-content/uploads/sites/2/2014/09/InteleViewer-brochure.pdf. Accessed on Feb. 9, 2015.
Intuitive Imaging Informatics, ImageQube, 1 page in color. Downloaded from http://www.intuitiveimaging.com/2013/pdf/ImageQube%20one-sheet.pdf. Accessed on Feb. 9, 2015.
Kuhl, Helen: Comparison Chart/PACS, Customers Are Happy, But Looking for More, (color) Imaging Techology News, itnonline.com, May 2012, pp. 24-27. Downloaded from http://www.merge.com/MergeHealthcare/media/company/In%20The%20News/merge-pacs-comparison.pdf. Accessed on Feb. 9, 2015.
LUMEDX CardioPACS 5.0 Web Viewer, Cardiopacs Module, 2 page color brochure, (506-10011 Rev A). Downloaded from http://cdn.medicexchange.com/images/whitepaper/cardiopacs_web_viewer.pdf?1295436926. Accessed on Feb. 9, 2015.
LUMEDX Cardiovascular Information System, CardioPACS, one page in color printout. Accessed at http://www.lumedx.com/pacs.aspx. Accessed on Feb. 9, 2015.
McKesson Enterprise Medical Imagining and PACS | McKesson, 1 page (color) printout. Accessed at http://www.mckesson.com/providers/health-systems/diagnostic-imaging/enterprise-medical-imaging. Accessed on Feb. 9, 2015.
Medweb Radiology Workflow Solutions, Radiology Workflow Solutions, Complete Workflow & Flexible Turnkey Solutions, Web RIS/PACS with Advanced Viewer, 3 page color brochure, © 2006-2014 Medweb. Downloaded from http://www.medweb.com/docd/rispacs_brochure_2014.pdf. Accessed on Feb. 9, 2015.
Merge Radiology Solutions, Merge PACS, A real-time picture archiving communication system, (PAX-21990 rev 2.0), 2 page color brochure. Downloaded from http://www.merge.com/MergeHealthcare/media/documents/brochures/Merge_PACS_web.pdf. Accessed on Feb. 9, 2015.
NOVARAD Enterprise Imaging Solutions, NOVAPACS, 2 page (color) printout. Accessed at http://ww1.novarad.net/novapacs. Accessed on Feb. 9, 2015.
PACSPLUS, PACSPLUS Server, 1 page (color) printout. Accessed at http://www.pacsolus.com/01_products/products_01.html. Accessed on Feb. 9, 2015.
PACSPLUS, PACSPLUS Workstation, 3 page (color) printout. Accessed at http://www.pacsplus.com/01_products/products_01.html. Accessed on Feb. 9, 2015.
PHILIPS IntelliSpace PACS, in 2 color page printout. Accessed at https://www.healthcare.philips.com/main/products/healthcare_informatics/products/enterprise_imaging_informatics/isite_pacs. Accessed on Feb. 9, 2015.

(56) References Cited

OTHER PUBLICATIONS

PHILIPS, IntelliSpace: Multi-modality tumor tracking application versus manual PACS methods, A time study for Response Evaluation Criteria in Solid Tumors (RECIST). 2012, Koninklijke Philips Electronics N.V., in four pages.

RamSoft, RIS PACS Teleradiology, PowerServer PACS, Lite PACS, XU PACS Compare RamSoft PACS Products, 2 color page printout. Accessed at http://www.ramsoft.com/products/powerserver-pacs-overview. Accessed on Feb. 9, 2015.

Sage Intergy PACS | Product Summary. Enhancing Your Workflow by Delivering Web-based Diagnostic Images When and Where You Need Them, in 2 color pages. (IRV-SS-INTPACS-PSS-031309). © 2009 Sage Software Healcare, Inc. Downloaded from http://www.greenwayhealth.com/solutions/intergy/. Accessed on Feb. 9, 2015.

ScImage, Cardiology PACS, in 8 color page printout. Accessed at http://www.scimage.com/solutions/clinical-solutions/cardiology. Accessed on Feb. 9 2015.

Sectra RIS PACS, in 2 color page printout. Accessed at https://www.sectra.com/medical/diagnostic_imaging/solutions/ris-pacs/. Accessed on Feb. 9, 2015.

Siemens syngo.plaza, Features and Benefits, in 2 color page printout. Accessed at http://www.healthcare.siemens.com/medical-imaging-it/imaging-it-radiology-image-management-pacs/syngoplaza/features. Accessed on Feb. 9, 2015.

Simms | RIS and PACS Medical Imaging Software, in 2 color page printout. http://www.mysimms.com/ris-pacs.php. Accessed on Feb. 9, 2015.

Stryker, Imaging—OfficePACS Power Digital Imaging, in one color page printout. Accessed from http://www.stryker.com/emea/Solutions/Imaging/OfficePACSPowerDigitalImaging/index.htm. Accessed on Feb. 9, 2015.

Stryker, OfficePACS Power—Digital Imaging, 8 page color brochure, (MPP-022 Rev 4 BC/MP 300 Jan. 2007). © 2007 Stryker. Downloaded from http://www.stryker.com/emea/Solutions/Imaging/OfficePACSPowerDigitalImaging/ssLINK/emea/1557/022268. Accessed on Feb. 9, 2015.

UltraRAD—ultra VISION, 1 page (color). Downloaded from http://www.ultraradcorp.com/pdf/UltraVISION.pdf. Accessed on Feb. 9, 2015.

VioStream for VitreaView, 2 color pages printout. Accessed at http://www.vitalimages.com/solutions/universal-viewing/viostream-for-vitreaview. Accessed on Feb. 9, 2015.

Visage Imaging Visage 7, 3 color page printout. Accessed at http://www.visageimaging.com/visage-7. Accessed on Feb. 9, 2015.

VIZTEK Radiology PACS Software Vixtek Opal-RAD, 4 color page printout. Accessed at http://viztek.net/products/opal-rad. Accessed on Feb. 9, 2015.

Voyager Imaging—Voyager PACS Radiologist Workstation, 2 page color brochure. Downloaded from http://www.intellirad.com.au/assets/Uploads/Voyager-PacsWorkstations.pdf?. Accessed on Feb. 9, 2015.

Voyager Imaging—Voyager PACS, 3 page color brochure. Downloaded from http://www.intellirad.com.au/index.php/assets/Uploads/Voyager-Pacs3.pdf. Accessed on Feb. 9, 2015.

Schellingerhout. "Coregistration of Head CT Comparision Studies: Assessment of Clinical Utility." Academic Radiology, vol. 10, No. 3. Mar. 2003. pp. 242-248.

Erickson et al. "Image Registration Improves Confidence and Accuracy of Image Interpretation." Cancer Informatics 2007: | 19-24.

Erickson et al. "Effect of Automated Image Registration on Radiologist Interpretation." Journal of Digital Imaging, vol. 20, No. 2 Jun. 2007; pp. 105-113.

Applicant-Initiated Interview Summary from the U.S. Patent and Trademark Office for U.S. Appl. No. 13/300,239 dated Nov. 18, 2014 (3 pages).

Applicant-Initiated Interview Summary from the U.S. Patent and Trademark Office for U.S. Appl. No. 13/300,239 dated Jan. 16, 2015 (2 pages).

Applicant-Initiated Interview Summary from the U.S. Patent and Trademark Office for U.S. Appl. No. 15/163,316 dated Aug. 1, 2017 (1 pages).

Non-Final Office Action from the U.S. Patent and Trademark Office for U.S. Appl. No. 15/163,316 dated May 9, 2018 (10 pages).

\* cited by examiner

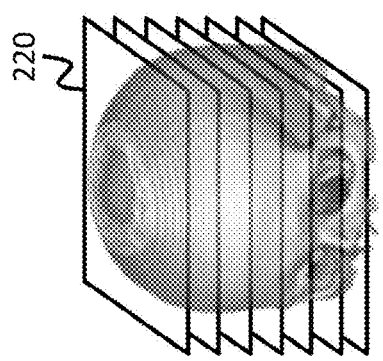
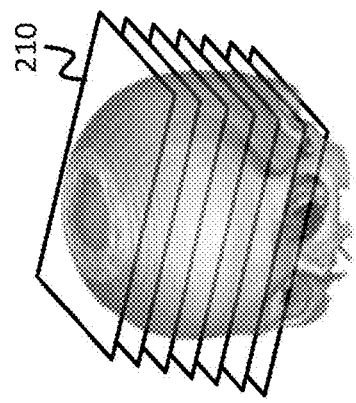
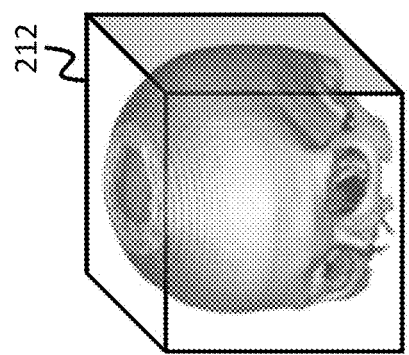
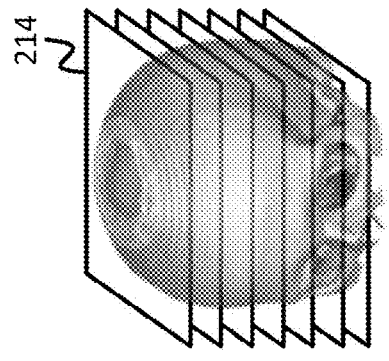
Fig. 2

502 — For what types of exams should matching 2D series be automatically generated?
- Brain CT
- Brain MRI
- Brain CT and MRI with a clinical diagnosis of hydrocephalus
- Brain CT and MRI with a clinical diagnosis of tumor

504 — What should be done with the generated matching 2D series?
- Stored temporarily for viewing by reading physician and archived at user's request.
- Automatically archived.

506 — What series type within the exam should be used for generation of the matching exam?
- For CT: pre and post contrast axial
- For MRI: 3D MPGR T1 (pre and post contrast) and T2 axial

508 — Which exam should be used as the comparison exam?
- Most recent comparison exam of same region with same modality
- Most recent comparison exam of same region with "similar" modality, e.g., a brain MRI could be compared with a brain MRI or CT.
- The exam chosen by the user.

510 — When generating the matching 2D series, which exam should be used?
- The old exam.
- The new exam.
- The exam with volumetric data available, old if available otherwise new.

512 — When should matching 2D series be generated?
- Automatically at the time a new exam is received by PACS.
- Automatically at the time that a user displays an exam on the Exam Display Computing Device.

Fig. 5

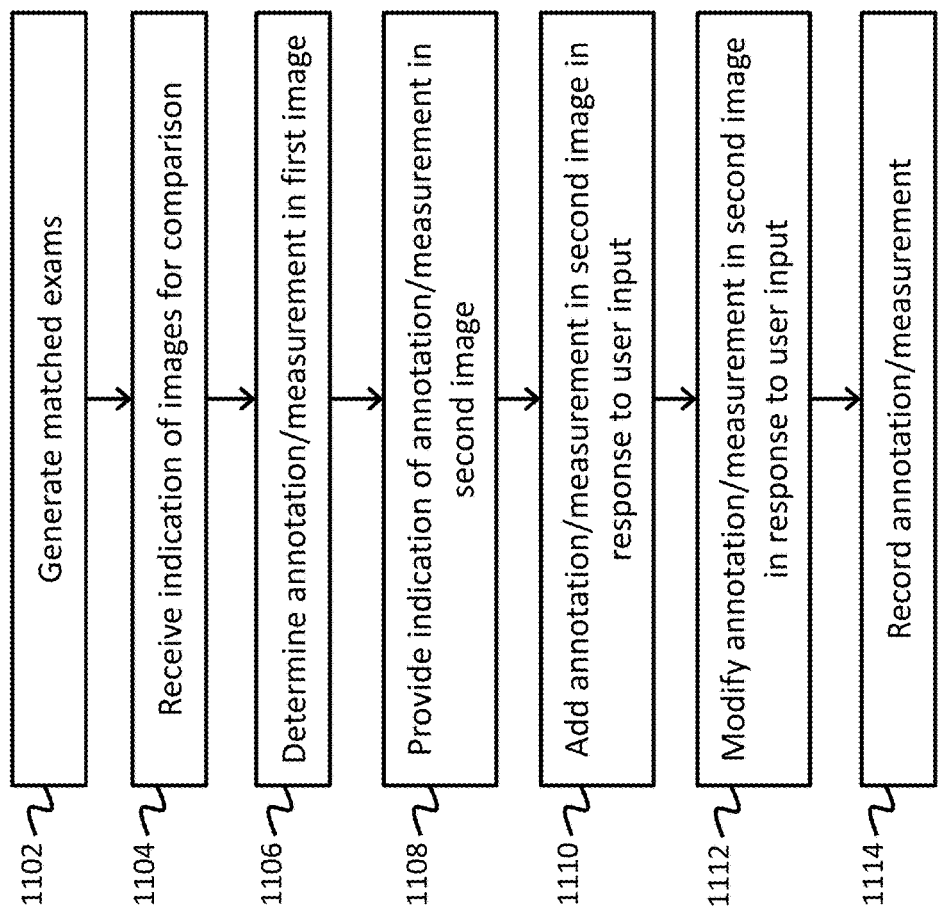

SYSTEMS AND USER INTERFACES FOR AUTOMATED GENERATION OF MATCHING 2D SERIES OF MEDICAL IMAGES AND EFFICIENT ANNOTATION OF MATCHING 2D MEDICAL IMAGES

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

This application is a non-provisional of, and claims benefit to, each of U.S. Provisional Patent Application No. 62/036,041, filed Aug. 11, 2014, and titled "GENERATION OF MATCHING 2D SERIES WITH AUTOMATIC RULES-BASED WORKFLOW," U.S. Provisional Patent Application No. 62/095,657, filed Dec. 22, 2014, and titled "SYSTEMS AND USER INTERFACES FOR AUTOMATED GENERATION OF MATCHING 2D SERIES OF MEDICAL IMAGES AND EFFICIENT ANNOTATION OF MATCHING 2D MEDICAL IMAGES," and U.S. Provisional Patent Application No. 62/112,922, filed Feb. 6, 2015, and titled "SYSTEMS AND USER INTERFACES FOR AUTOMATED GENERATION OF MATCHING 2D SERIES OF MEDICAL IMAGES AND EFFICIENT ANNOTATION OF MATCHING 2D MEDICAL IMAGES." The entire disclosure of each of the above items is hereby made part of this specification as if set forth fully herein and incorporated by reference for all purposes, for all that it contains.

TECHNICAL FIELD

Embodiments of the present disclosure relate to systems and techniques for accessing one or more databases of medical image data, automatically matching and/or registering related medical image data, and providing user interfaces for dynamic interactions with, and annotation of, medical image data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

When a patient undergoes a medical imaging exam, assessment of the exam by a reading physician often requires comparison of the exam to a prior medical imaging exam to assess changes in the patient's condition. For example, a physician viewing a CT scan of the brain might need to compare axial 2D images from the current exam to comparable exam images acquired six months ago.

SUMMARY

The systems, methods, and devices described herein each have several aspects, no single one of which is solely responsible for its desirable attributes. Without limiting the scope of this disclosure, several non-limiting features will now be discussed briefly.

It is common for a reading physician to make measurements or create annotations in medical images of an exam using computerized reading systems, commonly called PACS (Picture Archive and Communication Systems). Tumors, vascular stenosis, organs, or other items may be measured using linear dimensions, area, density in Hounsfield units, optical density, standard uptake value (e.g., for positron emission tomography), volume, curved lines (e.g., such as the length of a curved vessel), stenosis (percent narrowing of a vessel at a certain location relative to a reference location), or other parameters. In addition, annotations may include arrows to indicate specific locations or anatomy, circles, polygons, irregularly shaped areas, etc.

As mentioned above, assessment of a medical imaging exam of a patient by a reading physician (or other individual) often requires comparison of the exam (e.g., medical images of the exam) to a prior medical imaging exam to assess changes in the patient's condition. Unfortunately, despite efforts by the technologists acquiring the exams to be consistent, it is common for medical images of similar anatomical areas from different exams to differ in terms of one or more image characteristics (e.g., image angle or scan plane, image rotation, precise anatomical patient location included in the scan, etc.). For example, for two MRI scans of a patient, perhaps even acquired on a same MRI device on different days, if the patient is positioned differently when the scans are acquired (e.g., is laying on the MRI bed at a slightly different angle or position), the resulting MRI images from the two MRI scans may be in different scan planes of the patient.

When image characteristics (e.g., scan planes, anatomical locations, etc.) differ between exams, it can be difficult for the reading physician to accurately differentiate between real changes and artifactual changes between exams. Artifactual changes may include, for example, changes between two images (or image series) that result from differences in image characteristics rather than real changes in patient status, such as sizes of tumors, etc. For example, if an image angle used to generate images of a tumor in first and second exams of a patient is slightly different, measurements of the tumor in the two exams may result in differences in the tumor measurements of an irregular shaped tumor (e.g., even if the tumor is identical in each of the exams). Research has demonstrated that comparison of different exams is more accurate and efficient when artifactual differences are reduced or eliminated.

According to various embodiments, a system is disclosed herein by which medical imaging exams (including series of 2D images and/or 3D volumetric data) may be matched and/or registered so as to reduce and/or substantially eliminate artifactual differences between 2D images of (or other images reconstructed and/or rendered from) the exams. The system may automatically create new, matching 2D images such that two or more exams may be accurately and efficiently compared by the reading physician. The new, matching 2D images may be generated by automated 3D registration of the exams and/or multiplanar reformation of 3D volumetric data acquired during acquisition of one or both exams (e.g., during imaging scans) such that the new 2D images are automatically created from one exam that match the image angle and/or locations of the 2D images in the other exam.

In an embodiment, the system may automatically determine exams to be compared. Alternatively, the system may present a user interface to a user such that two exams to be compared may be selected. The system may then match the exams and present the matched 2D images to the user. The system may access rules that may be executed by a rules engine so as to select exams to be compared, determine 2D images to be matched, generate matched 2D images, and/or the like.

Additionally, as mentioned above, it is common for the reading physician to make annotations (including, e.g., measurements) in medical images of an exam. When comparing 2D images from two exams (e.g., two exams of the same patient but obtained at different times), it may be difficult for the physician to determine whether an earlier and/or later medical image includes annotations. Additionally, even when an earlier acquired image includes annotations, the physician may desire to add similar annotations to the matched, later acquired image. Doing so manually may be inefficient, error prone, and cumbersome.

According to various embodiments, the system disclosed herein may overcome these problems by providing efficient and interactive user interfaces and user interactions by which a physician (or other reviewer of images) may add annotations to medical images. In an embodiment, the system may automatically add indications to a later acquired image that may indicate to the physician that a corresponding earlier acquired image includes annotations. Additionally, the system may allow the physician to easily add and modify similar annotations to the later acquired image by selection of the indications.

Accordingly, in various embodiments the system disclosed herein may efficiently determine exams for comparison, automatically generate and/or match 2D images from the exams, automatically add indications of annotations in earlier acquired 2D images to later acquired 2D images, and/or enable efficient adding of similar annotations to the later acquired 2D images. Thus, a reviewing physician may be enabled to review and compare medical imaging exams in a more efficient, accurate, and less error prone way.

It has been noted that design of computer user interfaces "that are useable and easily learned by humans is a non-trivial problem for software developers." (Dillon, A. (2003) *User Interface Design*. MacMillan Encyclopedia of Cognitive Science, Vol. 4, London: MacMillan, 453-458.) The present disclosure describes various embodiments of interactive and dynamic user interfaces that are the result of significant development. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of images and may enable a user to more quickly and accurately access, navigate, assess, and digest the image data than previous systems.

Further, the interactive and dynamic user interfaces described herein are enabled by innovations in efficient interactions between the user interfaces and underlying systems and components. For example, disclosed herein are improved methods of determining exams to compare, generating and displaying matched 2D images, receiving user inputs (including efficient adding of annotations), translation and delivery of those inputs to various system components, automatic and dynamic execution of complex processes in response to the input delivery, automatic interaction among various components and processes of the system, and/or automatic and dynamic updating of the user interfaces (to, for example, display images and/or annotations). The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing medical image interaction technology (including, e.g., Picture Archiving and Communication Systems, Electronic Medical Record Systems, and/or the like) is limited in various ways (e.g., image review is slow and cumbersome, comparison of images is inefficient, etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic medical images to determine matches and registration, automatic processing of annotations of electronic medical images, and presentation of updates to displayed medical images via interactive graphical user interfaces. Such features and others (e.g., generation of 2D medical images from a 3D imaging volume and/or other 2D images, such as at automatically selected or user-selected planes) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic image data.

According to an embodiment, a computing system for processing medical imaging exams is disclosed, the computing system comprising: a non-transitory computer readable medium storing one or more software modules including computer executable instructions; and one or more hardware processors in communication with the non-transitory computer readable medium and configured to execute the one or more software modules in order to cause the computing system to: receive a first medical exam including at least a 3D data set obtained by a medical imaging scanner, the first medical exam further including a first image series having a plurality of images, wherein the first image series is rendered from the 3D data set; access a rules database including a plurality of rules indicating criteria for identifying related medical exams; identify a first rule in the rules database associated with one or more characteristics of the first medical exam, the first rule including one or more first criteria for identifying a second medical exam for comparison with the first medical exam; identify the second medical exam based on the one or more first criteria of the first rule; access the second medical exam, the second medical exam including a second image series having a second plurality of images obtained by a medical imaging scanner; compare the first and second image series; determine, based on the comparison, that the first and second image series differ from one another with respect to at least scan planes associated with the respective first and second image series; in response to determining that the first and second image series differ from one another with respect to at least their respective scan planes, determine an adjustment to be made to the scan plane of the first image series such that, after the adjustment, the scan plane of the first image series matches the scan plane of the second image series; re-render, based on the adjustment, the first image series from the 3D data set of the first medical exam such that the scan plane of the re-rendered first image series matches the scan plane of the second image series; receive a selection of an image of the re-rendered first image series by a user; automatically determine an image of the second medical exam corresponding to the image of the first medical exam; automatically determine a type and location of an annotation in the image of the second medical exam; automatically add an indication of the annotation to the image of the re-rendered first image series in a location in the image of the re-rendered first image series corresponding to the location of the annotation in the image of the second medical exam; and provide the image of the re-rendered first image series, including the indication of the annotation, to a display device for display to the user.

According to another embodiment, a computing system for processing medical imaging exams is disclosed, the computing system comprising: a non-transitory computer readable medium storing one or more software modules including computer executable instructions; and one or more hardware processors in communication with the non-transitory computer readable medium and configured to execute the one or more software modules in order to cause the computing system to: receive a first medical exam including at least a first image series having a plurality of images obtained by a medical imaging scanner; access a rules database including a plurality of rules indicating criteria for identifying related medical exams; identify a first rule in the rules database associated with one or more characteristics of the first medical exam, the first rule including one or more first criteria for identifying a second medical exam for comparison with the first medical exam; identify the second medical exam based on the one or more first criteria of the first rule; access the second medical exam, the second medical exam including a second image series having a second plurality of images obtained by a medical imaging scanner; compare the first and second image series; determine, based on the comparison, that the first and second image series differ from one another with respect to at least one image characteristic associated with both the first and second image series; determine an adjustment to be made to the at least one image characteristic associated with the first image series such that the at least one image characteristic associated with the first image series matches the at least one image characteristic associated with the second image series; generate, based on application of the adjustment, one or more 2D images based on the first image series that include the at least one image characteristic associated with the second image series; and provide at least one of the generated 2D images to a display device for display to a user.

According to an aspect, the at least one image characteristic comprises at least one of an image angle, an anatomical position, an image orientation, an image rotation, a field of view, a slice thickness, an image window, and image level, an image color map, an image opacity, or a DICOM frame of reference.

According to another aspect, the one or more hardware processors are configured to execute the one or more software modules in order to further cause the computing system to determine the adjustment to be made to the at least one image characteristic by at least: in response to determining that the first and second image series are offset from another with respect to at least one of: the image angle, the anatomical position, or the image rotation: in response to determining that there is an offset of the image angle between the first and second image series, determining an angle offset; in response to determining that there is an offset of the image rotation between the first and second image series, determining a rotation offset; and in response to determining that there is an offset of the anatomical position between the first and second image series, determining a position offset.

According to yet another aspect, the one or more hardware processors are configured to execute the one or more software modules in order to further cause the computing system to generate the one or more 2D images by at least: generating, based on application of the angle offset, the position offset, and/or the rotation offset, the one or more 2D images based on the first image series such that the one or more 2D images are not offset from the second image series and match at least one of an image angle, and anatomical position, or an image rotation of the second image series.

According to another aspect, the one or more hardware processors are configured to execute the one or more software modules in order to further cause the computing system to determine the adjustment by at least: determining a common DICOM frame of reference for the first and second image series.

According to yet another aspect, the one or more hardware processors are configured to execute the one or more software modules in order to further cause the computing system to generate the one or more 2D images by at least: generating, based on the determined common DICOM frame of reference, the one or more 2D images based on the first image series such that a DICOM frame of reference of the one or more 2D images match a DICOM frame of reference of the second image series.

According to another aspect, the one or more hardware processors are configured to execute the one or more software modules in order to further cause the computing system to: receive a selection of one of the generated 2D images; determine a corresponding 2D image of the second image series; determine a type and location of an annotation in the corresponding 2D image; and add an indication of the annotation to the one of the generated 2D images in a location in the one of the generated 2D images corresponding to the location of the annotation in the corresponding 2D image of the second image series.

According to yet another aspect, the one or more hardware processors are configured to execute the one or more software modules in order to further cause the computing system to: receive a user input selecting the added indication; and convert the indication to a new annotation similar to the annotation in the corresponding 2D image of the second image series.

According to another aspect, the one or more hardware processors are configured to execute the one or more software modules in order to further cause the computing system to: receive a user input modifying the new annotation; and store the modified new annotation.

According to yet another aspect, the one or more hardware processors are configured to execute the one or more software modules in order to further cause the computing system to: select a type of the indication based on the determined type of the annotation in the corresponding 2D image.

According to another aspect, the annotation comprises at least one of: a label, a measurement, an outline, a graphic, an assessment, or a note.

According to yet another aspect, the one or more hardware processors are configured to execute the one or more software modules in order to further cause the computing system to: automatically process the one of the generated 2D images, based at least in part on the type and location of the annotation, to determine a second annotation; and add the second annotation of the one of the generated 2D images.

According to another aspect, the one or more hardware processors are configured to execute the one or more software modules in order to further cause the computing system to: determine, for the at least one of the generated 2D images, a matching 2D image of the second image series; determine that the matching 2D image includes at least one annotation; and provide, to the user and via the display device, an indication of the at least one annotation.

According to yet another aspect, the one or more hardware processors are configured to execute the one or more software modules in order to further cause the computing system to provide the indication of the at least one annotation by at least: providing the indication in a location adjacent to, but not overlapping displayed imaging data of, the at least one of the generated 2D images.

According to another aspect, the one or more hardware processors are configured to execute the one or more software modules in order to further cause the computing system to: receive a first user input selecting the indication; in response to the first user input, provide a second indication of the second image series; receive a second user input selecting the second indication; and in response to the second user input, providing the matching 2D image for display adjacent to the at least one of the 2D images.

According to yet another aspect, the one or more hardware processors are configured to execute the one or more software modules in order to further cause the computing system to generate the one or more 2D images by at least: accessing 3D volumetric imaging data associated with the first image series; determining a coordinate system of the second image series based on the determined adjustment; and generating the one or more 2D images based on the 3D volumetric imaging data and the determined coordinate system via multiplanar reformation.

According to another aspect, the rules database further includes a second plurality of rules indicating criteria for identifying image series types for comparison, wherein the one or more hardware processors are configured to execute the one or more software modules in order to further cause the computing system to: identify a second rule in the rules database, the second rule including one or more second criteria for identifying an image series type for comparison; select, based on the second rule, the first image series from the first image series, wherein the first image series is of the image series type; and select, based on the second rule, the second image series from the second image series, wherein the second image series is of the image series type.

According to yet another embodiment, a computing system for processing medical imaging exams is disclosed, the computing system comprising: a non-transitory computer readable medium storing one or more software modules including computer executable instructions; and one or more hardware processors in communication with the non-transitory computer readable medium and configured to execute the one or more software modules in order to cause the computing system to: receive a first medical image series; access a first rule from a rules database, the first rule indicating that the first medical image series is to be matched with a second medical image series; access the second medical image series; compare the first and second medical image series; determine, based on the comparison, that the first and second medical image series differ from one another with respect to at least one image characteristic associated with both the first and second medical image series; determine an adjustment to be made to the at least one image characteristic associated with the first medical image series such that the at least one image characteristic associated with the first medical image series matches the at least one image characteristic associated with the second medical image series; generate, based on application of the adjustment, 2D images based on the first medical image series that match the second medical image series; and provide the generated 2D images to a display device for display to a user.

According to an aspect, the first and second medical image series are both part of a same medical exam.

According to another aspect, the first medical image series includes pre-contrast images and the second medical image series includes post-contrast images.

According to yet another aspect, the one or more hardware processors are further configured to execute the one or more software modules in order to cause the computing system to: determine a type and/or location of an annotation in a 2D image of the second medical exam; determine a corresponding 2D image of the generated 2D images; and add an indication of the annotation to the corresponding 2D image in a location in the corresponding 2D image corresponding to the type and/or location of the annotation in the 2D image of the second medical image series.

According to another embodiment, a computing system for processing medical imaging exams is disclosed, the computing system comprising: a non-transitory computer readable medium storing one or more software modules including computer executable instructions; and one or more hardware processors in communication with the non-transitory computer readable medium and configured to execute the one or more software modules in order to cause the computing system to: receive a first medical image series; access a first rule from a rules database, the first rule indicating that the first medical image series is to be matched with a second medical image series; access the second medical image series; compare the first and second medical image series; determine, based on the comparison, common DICOM frames of reference between the first and second medical image series; and provide images of at least one of the first or second medical image series to a display device for display to a user.

According to an aspect, the one or more hardware processors are further configured to execute the one or more software modules in order to cause the computing system to: determine a type and/or location of an annotation in a first image of the second medical exam; determine a second corresponding image of the first medical exam based on the common DICOM frame of reference; and add an indication of the annotation to the second corresponding image in a location in the second corresponding image corresponding to the type and/or location of the annotation in the first image of the second medical image series.

According to another aspect, the one or more hardware processors are further configured to execute the one or more software modules in order to cause the computing system to: receive a selection of the second corresponding image; provide the second corresponding image, including the indication of the annotation, to the display device for display to the user; and automatically provide the first image, including the annotation, to the display device for display to the user.

According to yet another aspect, the first and second medical image series are both part of a same medical exam.

According to another aspect, the first medical image series includes pre-contrast images and the second medical image series includes post-contrast images.

Additional embodiments of the disclosure are described below in reference to the appended claims, which may serve as an additional summary of the disclosure.

In various embodiments, computer-implemented methods are disclosed in which, under control of one or more hardware computing devices configured with specific computer executable instructions, one or more aspects of the above-described embodiments (including one or more aspects of the appended claims) are implemented and/or performed.

In various embodiments, non-transitory computer-readable storage mediums storing software instructions are disclosed, wherein, in response to execution by a computing system having one or more hardware processors, the software instructions configure the computing system to perform operations comprising one or more aspects of the above-described embodiments (including one or more aspects of the appended claims).

Further, as described herein, various embodiments of the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 2 is a diagram visually illustrating an example process of generating 2D images from one exam that match 2D images of another exam, according to embodiments of the present disclosure.

FIG. 5 illustrates various example rules that may be executed by a rules engine of the system during execution of a process of determining comparison exams and generating matching 2D images, according to embodiments of the present disclosure.

FIG. 11 is a flowchart illustrating an example method of the system, according to an embodiment of the present disclosure.

DETAILED DESCRIPTION

Figure 1:
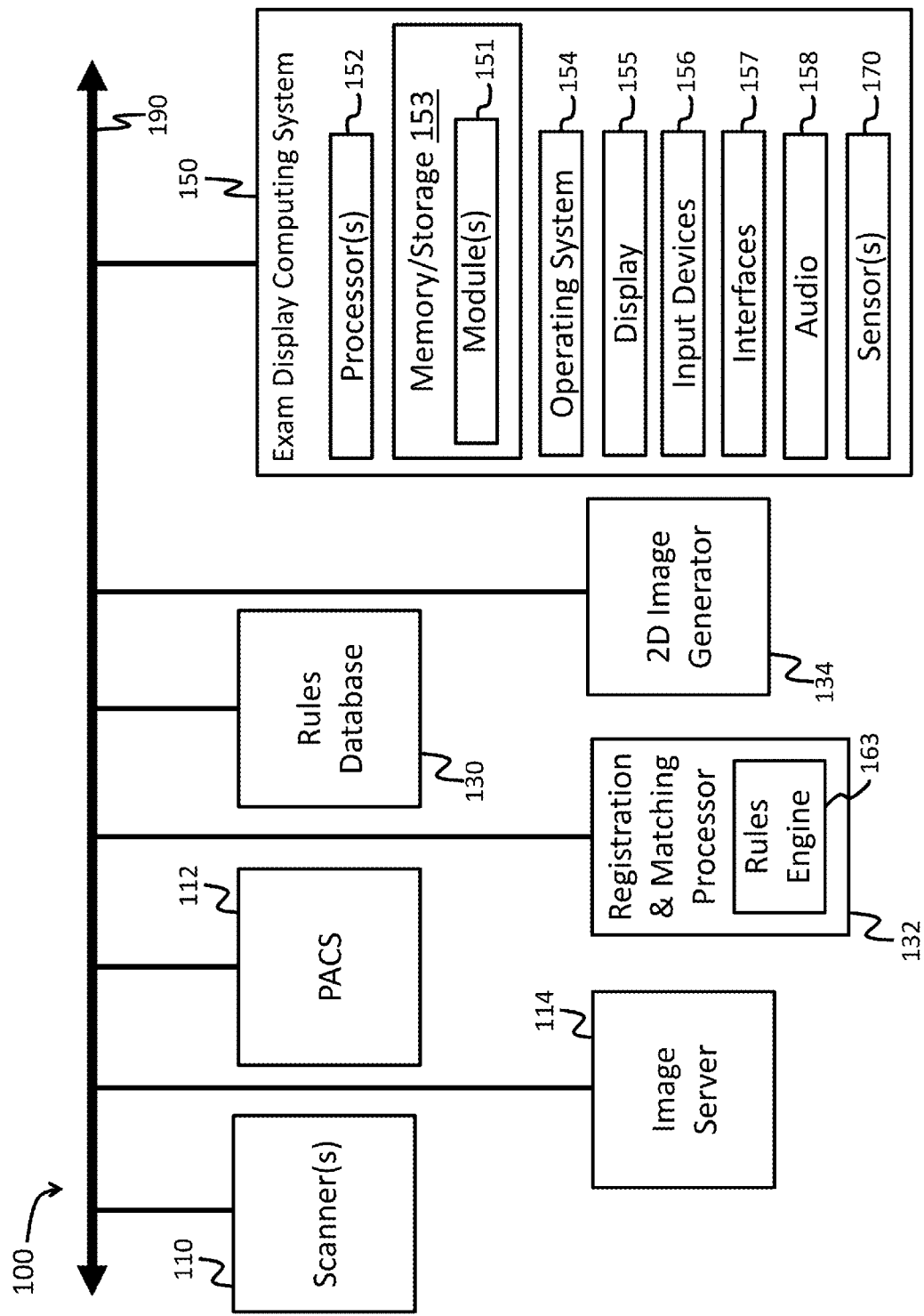
FIG. 1 is a block diagram showing various components of a computing system and network environment in which various embodiments of the present disclosure may be implemented.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

I. Overview

As mentioned above, according to various embodiments, a system is disclosed by which medical imaging exams (including series of 2D images and/or 3D volumetric data) may be matched and/or registered so as to reduce and/or substantially eliminate artifactual differences between 2D images of the exams. The system may automatically create new, matching 2D images such that two or more exams may be accurately and efficiently compared by the reading physician. The new, matching 2D images may be generated by automated 3D registration of the exams and/or multiplanar reformation of 3D volumetric data acquired during acquisition of one or both exams (e.g., during imaging scans) such that the new 2D images are automatically created from one exam that match the image angle and/or locations of the 2D images in the other exam.

Rendering and/or reconstruction of images from 3D or volumetric image data can be a computationally intensive task that requires significant processing power. Three-dimensional medical image data sets can be on the order of multiple gigabytes in size, therefore requiring efficient computer algorithms to generate human-useable images and other information. Typically, such 3D data sets are acquired by CT, MRI, and/or other similar modality. Volume rendering (e.g., rendering 2D projections of 3D data sets) may be accomplished by, e.g., direct volume rendering, maximum intensity projection, and/or the like, and may require one or more computational optimization techniques to be fast enough to be useful. Other reconstruction processes (e.g., rendering 2D slices of 3D data sets) include, e.g., multiplanar reconstruction. These processes also require processing of large 3D data sets via optimized rendering and/or reconstruction algorithms on computer processors.

In an embodiment, the system may automatically determine exams to be compared. Alternatively, the system may present a user interface to a user such that two exams to be compared may be selected. The system may then match the exams and present the matched 2D images to the user. The system includes rules that may be executed by a rules engine so as to select exams to be compared, determine 2D images to be matched, generate matched 2D images, and/or the like. Examples of systems and methods for selecting images and/or image series for comparison are disclosed in U.S. patent application Ser. No. 12/870,645, filed Aug. 27, 2010, and titled "SYSTEMS AND METHODS FOR MATCHING, NAMING, AND DISPLAYING MEDICAL IMAGES," the entire disclosure of which is hereby made part of this specification as if set forth fully herein and incorporated by reference for all purposes, for all that it contains.

As also mentioned above, according to various embodiments, the system disclosed herein may provide efficient and interactive user interfaces and user interactions by which a physician (or other reviewer of images) may add annotations to medical images. In an embodiment, the system may automatically add indications to a later acquired image that may indicate to the physician that a corresponding earlier acquired image includes annotations. Additionally, the system may allow the physician to easily add and modify similar annotations to the later acquired image by selection of the indications.

Accordingly, in various embodiments the system disclosed herein may efficiently determine exams for comparison, automatically generate and/or match 2D images from the exams, automatically add indications of annotations in earlier acquired 2D images to later acquired 2D images, and/or enable efficient adding of similar annotations to the later acquired 2D images. Thus, a reviewing physician may be enabled to review and compare medical imaging exams in a more efficient, accurate, and less error prone way.

As described above, various embodiments of the present disclosure provide improvements to various technologies and technological fields, including medical image interaction technology (including, e.g., Picture Archiving and Communication Systems, Electronic Medical Record Systems, and/or the like). Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic medical images to determine matches and registration, automatic processing of annotations of electronic medical images, and presentation of updates to displayed medical images via interactive graphical user interfaces. Such features and others (e.g., generation of 2D medical images from a 3D imaging volume and/or other 2D images, such as at automatically selected or user-selected planes) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic image data.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

II. Definitions

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

User: Also referred to herein as "reviewer" and/or "viewer." An individual (or group of individuals) that interfaces with a computing device to, for example, view medical images. Users may include, for example, physicians (including, for example, doctors, radiologists, etc.) hospital staff, and/or any other individuals (including persons not medically trained) involved in analysis, annotation, comparison, acquisition, storage, management, or other tasks related to medical images (or any other types of images) as described herein. Any discussion herein of user preferences and/or rules associated with users should be construed to also, or alternatively, include user group preferences (or rules associated with groups of users), site preferences/rules, system preference/rules, and/or default software preferences/rules.

Figure 13A:
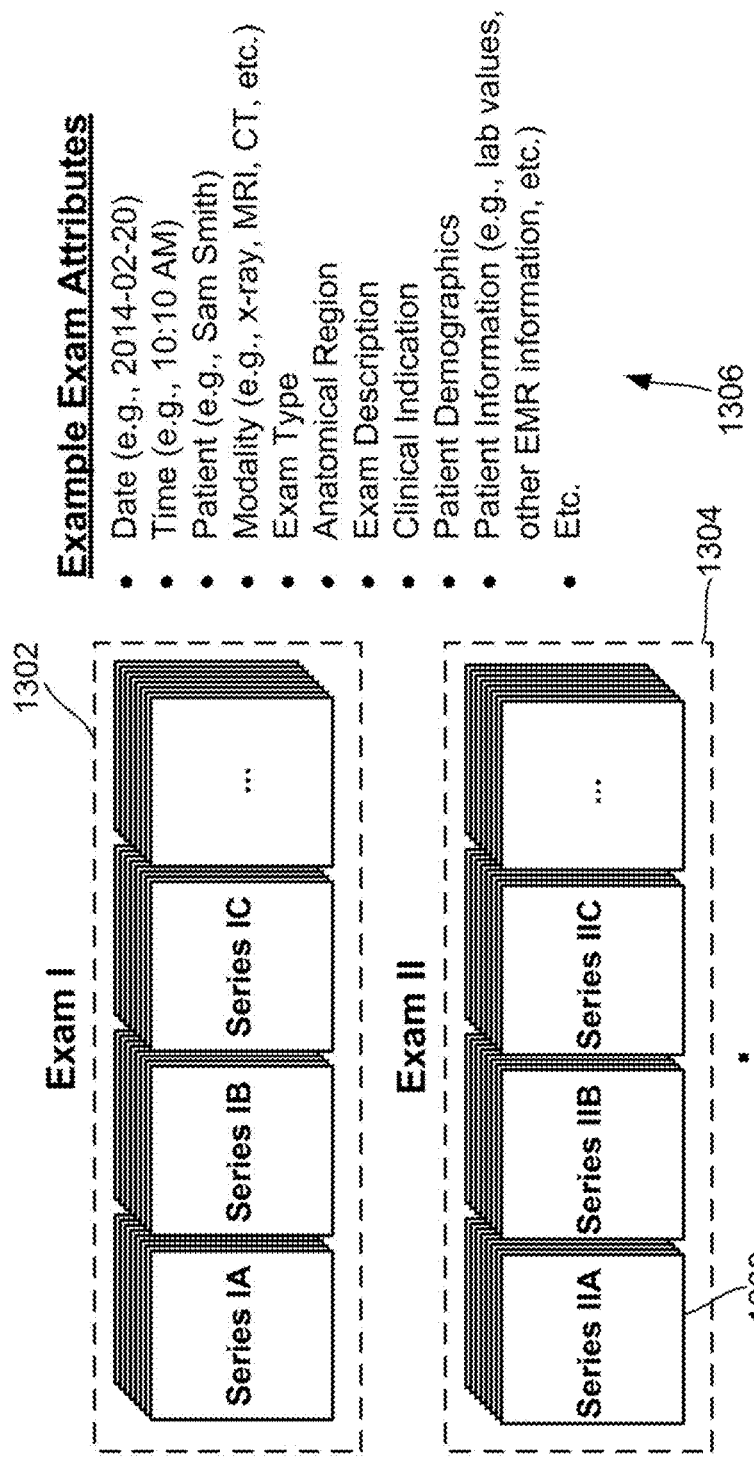
FIGS. 13A-13B illustrate various example attributes that may be associated with exams, image series, and images, according to embodiments of the present disclosure.
Figure 13B:
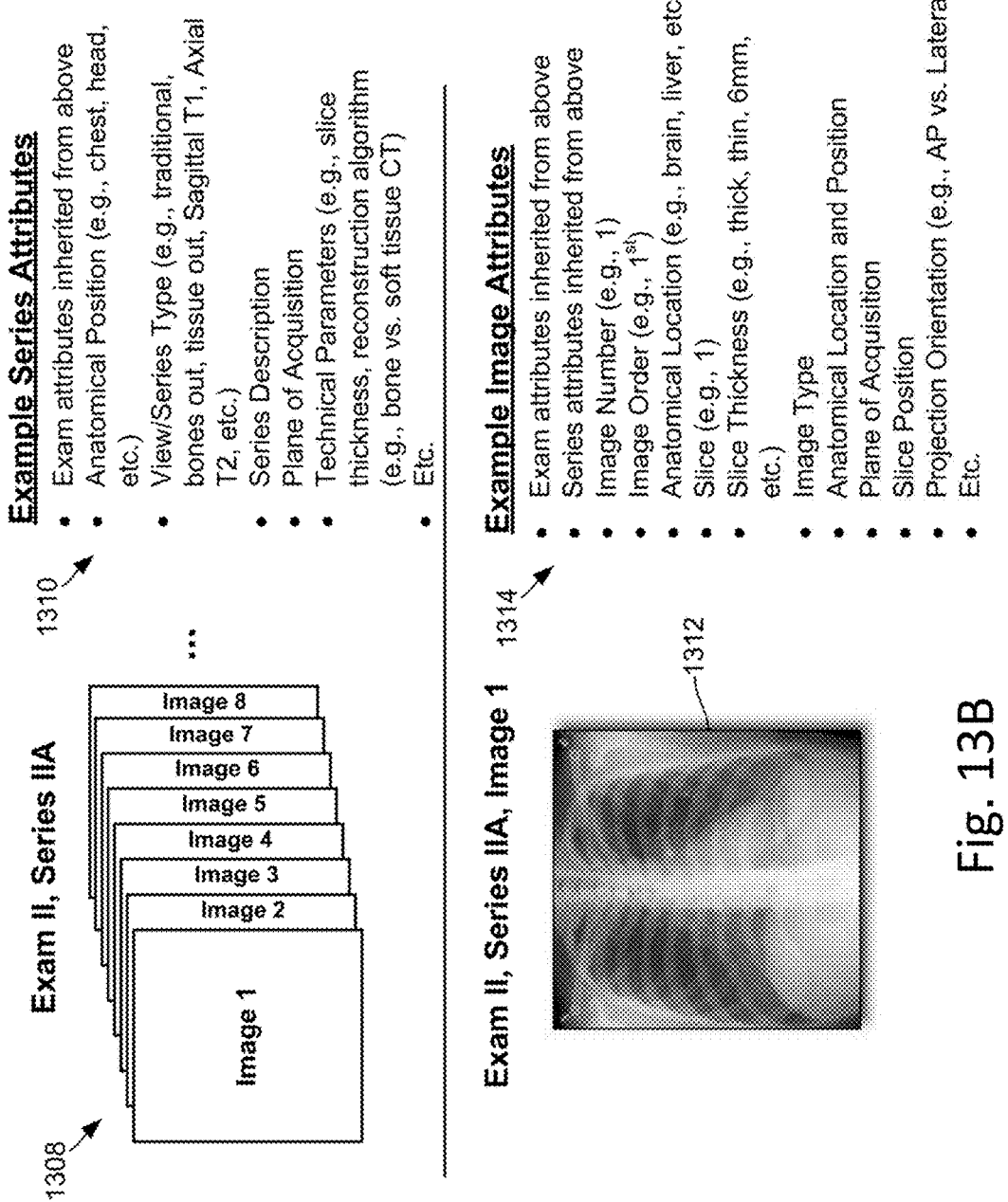

Medical Image: Any type of image of an organism (e.g., a human patient). It may include but is not limited to a radiograph (e.g., an x-ray image), computed tomography (CT), magnetic resonance imaging (MRI), Ultrasound (US), mammogram, positron emission tomography scan (PET), nuclear scan (NM), pathology, endoscopy, ophthalmology, or many other types of medical images. As mentioned above, medical images may be reconstructed and/or rendered from 3D or volumetric image data using methods including multiplanar reformation/reconstruction (MPR), maximum intensity projection (MIP), and/or the like (including, e.g., any Computerized Advanced Processing (CAP), as described below). FIG. 13B illustrates an example of a medical image 1312 and possible attributes that may be associated with a medical image. While this description is directed to processes related to medical images, the methods and systems described herein may also be used in conjunction with non-medical images, such as, images of circuit boards, airplane wings, and satellite images, for example. Accordingly, medical images may also be referred to herein simply as "images." In some embodiments, images described herein may be obtained directly via a scan of a patient using a modality by which 2D images are directly obtained (e.g., x-ray imaging, CT, MRI, etc.). In some embodiments, images described herein may be 2D images (e.g., image slices) obtained from 3D imaging data, such as via MPR or another CAP, as described above and below. In some embodiments, images described herein may comprise images of 3D renderings of 3D imaging data at particular angles and/or views. In some examples, such 3D renderings may be dynamic and interactive such that a user may interact with the images to change the views of the 3D renderings presented. Accordingly, while the present disclosure may refer to 2D images, such 2D images may include images of 3D renderings of 3D imaging data. Any combination of the above-mentioned types of images may be used with the methods and system described below.

Modality: A medical imaging method (e.g., a patient who undergoes an MRI is said to have been scanned with the MRI modality).

Image Series: Also referred to herein as "series." Any two or more images that are related. Images in a series typically share one or more common attributes, for example, a type of anatomic plane and/or an image orientation. For example, an image series may comprise two or more images of a particular patient that are acquired on a particular date, e.g., different x-ray projections of the chest. A series of contiguous 3 mm axial CT scans of the chest is another example of an image series. A brain MRI scan might include the following series: sagittal T1 weighted images, axial T1 weighted images, axial FLAIR images, axial T2 weighted images, as well as post contrast axial, sagittal and coronal T1 weighted series. An image series of an exam may be identified by its "type" (also referred to herein as a "series type" and/or a "view type"). For example, series may be acquired using different pulse sequences, acquired in different anatomic planes (also referred to herein as "imaging planes"), and/or acquired before or after administration of intravenous contrast material. An image series may be limited to images of a certain modality or may comprise images of multiple modalities. FIG. 13B illustrates an example of an image series 1308, as well as example attributes that may be associated with an image series. As shown, the image series 1308 includes multiple medical images, such as medical image 1312.

Patient: An individual who undergoes a medical imaging examination.

Medical Imaging Exam: Also referred to herein as a "medical exam" or an "exam." A collection of data related to an examination of a patient. May be specific to a particular time or time period. Generally includes one or more medical images and/or image series, reports, notes, graphs, measurements, annotations, videos, sounds or voice data, diagnoses, and/or other related information. May include multiple image series of multiple modalities, volumetric imaging data, reconstructed images, and/or rendered images. For example, an exam of a patient may be the brain MRI scan mentioned above, and may include each of the image series obtained on a particular date including: sagittal T1 weighted images, axial T1 weighted images, axial FLAIR images, axial T2 weighted images, as well as post contrast axial, sagittal and coronal T1 weighted series. Another example of an exam may be a dual-energy radiography exam, which may include image data including traditional x-ray image images, bone subtracted (or "bone out") x-ray images, and/or tissue subtracted (or "tissue out") x-ray images. FIG. 13A illustrates two example medical exams 1302 and 1304. As shown, each medical exam 1302 and 1304 includes multiple image series, such as image series 1308 which is a part of medical exam 1304.

Image Characteristic: Any characteristic related to display of an image. Includes without limitation, image angle (e.g., an angle of an image with reference to a standard one or more planes of human anatomy; also referred to herein as "scan plane"), anatomical position (and/or location) (e.g., a location, with reference to a standard one or more planes of human anatomy, of the patient represented in a particular image), image orientation (e.g., an orientation of the image with reference to a standard one or more planes of human anatomy), image rotation (e.g., a rotation of the image with reference to a standard one or more planes of human anatomy), image field of view, slice thickness, image window and/or level (e.g., a contrast of the image, a brightness of the image, and/or the like), image color map (e.g., that includes information for rendering different pixel intensities as different colors), other color characteristics, image opacity (and/or opacity map), image zoom level, image cropping information, and/or the like. In some instances, one or more image characteristics may be user defined and/or based on user preferences. The term "image characteristics" is used herein in reference to 2D medical images to refer to the various characteristics of the images with reference to the physical anatomy of a patient from which they were obtained. Such 2D medical images may be obtained to show a particular slice of a patient at a particular location such that a diagnosis of the patient may be made. As described below, later obtained 2D medical images of a same location may vary with respect to one or more image characteristics such that a valid comparison between the later obtained 2D image and the earlier 2D image is difficult. Such difficulty may arise due to variance in any image characteristics of the images, including those mentioned above. Image characteristics are also referred to herein as image "attributes." Further examples of attributes are described below.

Artifactual Difference: A difference between two images that is not due to changes in patient structure, physiology, anatomy, pathology, and/or the like, but rather is a result of different image characteristics between the two images. Thus, artifactual differences do not indicate changes in physical or bodily structure of a patient (such as position, size, density, etc., of particular organs, tendons, muscles, bones, tumors, or other anatomical features). For example, scan planes of two images may differ, causing features of the two images to appear different from one of the other, even when there may be no actual differences in patient structure, physiology, anatomy, pathology, and/or the like. Such scan plane differences may be a result of, e.g., differences in patient position within the imaging scanner, differences in imaging scanner used and/or settings of the imaging scanner, and/or differences in how the 2D images are generated (e.g., how the plane of reconstruction and/or rendering of 2D images from a 3D volume is selected). Artifactual differences contrast with "physical," or "actual," differences which are a result of changes in patient structure, physiology, anatomy, pathology, and/or the like. Accordingly, artifactual differences between medical images can be a source of faulty image interpretation, diagnosis, and even patient treatment. In various embodiments, the systems and methods described herein efficiently and automatically eliminate, or substantially eliminate, artifactual differences (due to, e.g., differing image characteristics) in images for comparison such that actual differences (e.g., changes in a physical characteristic of a patient) may be more accurately, efficiently, and easily discerned by a user. When images from one exam are generated so as to have image characteristics matching those of another exam (thus eliminating, or substantially eliminating, artifactual differences between respective corresponding images of the two exams), the images from the one exam are referred to herein as "matching images" or "matching 2D images."

Attribute: Any characteristic associated with a data item (e.g., a data item such as a medical exam, an image series, a medical image, and/or the like). Attributes may be inherited in a hierarchical manner. For example, a medical image may inherit attributes of an image series of which it is a part, and an image series may inherit attributes of a medical exam of which it is a part. Attributes may be stored as part of an associated data item (e.g., as metadata, DICOM header data, etc.) and/or separately from an associated data item. FIGS. 13A-13B illustrate various example attributes that may be associated with exams (e.g., example attributes 1306), image series (e.g., example attributes 1310), and images (e.g., example attributes 1314).

Sorting: A process of arranging images from multiple image series (and/or medical exams and/or other sources (e.g., Clinical Decision Support ("CDS") data, as described below)). In some embodiments, the process of sorting images from multiple image series may include generating a resultant "sorted" image series. While in some embodiments a sorted image series (including images from multiple image series) is generated, generation of a sorted image series is not necessary. Rather, in various embodiments, the process of sorting images may include determining an order of the images, which order may then be referenced when, for example, the images are displayed and/or viewed. For example, the system may simply reference pointers to images from multiple image series; the system may generate a "sorting metadata" file associated with the sorted series that indicates how images from multiple image series are sorted; and/or pointers to images from multiple image series may be determined in real-time as images are viewed in a sorted order. "Interleaving" is an example of a type of sorting of images in which images of multiple images series are regularly alternated. For example, in some embodiments, an interleaved image series comprises images from multiple image series ordered so that the interleaved image series alternates between the images of the original series. For example, when image series A comprising images A1, A2, . . . , An, image series B comprising images B1, B2, . . . , Bn, and image series C comprising images C1, C2, . . . , Cn are interleaved, the resultant interleaved image series may be ordered: A1, B1, C1, A2, B2, C2, . . . , An, Bn, Cn. Some embodiments and examples described below refer to "interleaving" of images, however other types of sorting may be used in those embodiments and examples. Images from multiple image series may be sorted in various patterns and multiple sortings may be determined from two or more image series. Images may be sorted based on one or more attributes associated with images, series, and/or exams. When images are sorted based on multiple attributes, a sorting of the images may be performed based on the attributes based on a priority of the attributes.

Image Pane: Also referred to herein as "image frame," "viewing pane," "viewing frame," "comparison pane," "comparison frame," and/or simply "pane." A region of a computer display that may display an image.

Annotation: Any notes, measurements, links, assessments, graphics, and/or the like, associated with a data item, either automatically (e.g., by one or more CAP, described below) or manually (e.g., by a user). For example, when used in reference to a medical image, annotations include, without limitation, any added information that may be associated with the image, whether incorporated into an image file directly, comprising metadata associated with the image file, and/or stored in a separate location but linked to the image file in some way. Examples of annotations include measurements by using linear dimensions, area, density in Hounsfield units, optical density, standard uptake value (e.g., for positron emission tomography), volume, curved lines (such as the length of a curved vessel), stenosis (e.g., percent narrowing of a vessel at a certain location relative to a reference location), or other parameters. Additional examples of annotations include arrows to indicate specific locations or anatomy, circles, polygons, irregularly shaped areas, notes, and/or the like. Further examples of annotations include graphics that, for example, outline lesions, lumbar discs, and/or other anatomical features.

Computerized Advanced Processing (CAP): Any computerized image analysis, image analysis technique, and/or image processing technique discussed herein, and/or any similar computerized processing technique that is currently or later available. CAP is described herein with regard to radiology images, but CAP and the systems and methods described herein may be applied in other areas including, but not limited to, other types of medical images (for example, cardiology, dermatology, pathology and/or endoscopy, among others), computer generated images (for example, 3D images from virtual colonoscopy, 3D images of vessels from CTA, and the like), images from other fields (for example, surveillance imaging, satellite imaging, and the like), as well as non-imaging data including audio, text, and numeric data. In some embodiments, CAP may include, but is not limited to, volume rendering (including, for example, multiplanar reformation/reconstruction (MPR), maximum intensity projection (MIP), 3D volume rendering, and/or 3D surface rendering), graphical processing/reporting (e.g., automated identification and outlining of lesions, lumbar discs etc.), automated measurement of lesions or other anatomical features, other image processing techniques, and/or the like.

User Input: Also referred to herein simply as "input." As used herein in reference to user interactions with data displayed by a computing system, "user input" is a broad term that refers to any type of input provided by a user that is intended to be received and/or stored by the system, to cause an update to data that is displayed by the system, and/or to cause an update to the way that data is displayed by the system. Non-limiting examples of such user input include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a surgical instrument, tool, stylus, or wand, to provide inputs. Further, user inputs may include motion, position, rotation, angle, alignment, orientation, configuration (e.g., fist, hand flat, one finger extended, etc.), and/or the like. For example, user inputs may comprise a position, orientation, and/or motion of a hand and/or a 3D mouse.

Database: Also referred to herein as "data store" and/or "data structure." Any data store or data structure (and/or combination of multiple data stores, data structures, and/or databases) for storing data. Includes, but is not limited to, databases such as RDBMS, SQL, NoSQL. The term "database" further includes, but is not limited to, other data storage structures such as comma separated values (CSV) files, eXtendible markup language (XML) files, TeXT (TXT) files, flat files, spreadsheet files, and/or any other widely used or proprietary format for data storage.

III. Example Computing Devices and Systems

FIG. 1 is a block diagram showing various aspects of an Exam Display Computing System 150 and network environment 100 in which the Exam Display Computing System 150 may be implemented, according to various embodiments of the present disclosure. The Exam Display Computing System 150 may be referred to herein as the "data navigation system," the "medical image computing system," simply the "system," and/or the like.

As shown, the network environment 100 may include the computing system 150, a computer network 190, one or more scanners 110, an image server 114, a Picture Archive and Communication System (PACS) 112, a registration and matching processor 132, a rules database 130, and a 2D image generator 134. The registration and matching processor 132 may additionally include a rules engine 163. As described below, in various embodiments the computing system 150, the one or more scanners 110, the image server 114, the Picture Archive and Communication System (PACS) 112, the registration and matching processor 132, the rules database 130, and the 2D image generator 134 may be in communication with one another via the network 190. In some embodiments, various of the one or more scanners 110, the image server 114, the Picture Archive and Communication System (PACS) 112, the registration and matching processor 132, the rules database 130, and the 2D image generator 134 may or may not be considered a part of the computing system 150 (and thus, "the system," as referred to herein). For example, in some embodiments one or more of these components may be implemented as part of the computing system 150, may be in direct communication with the computing system 150, and/or may be in indirect communication (e.g., over network 190) with the computing system 150.

In various embodiments, computing system 150 may be a desktop computer, a laptop computer, a tablet computer, a smartphone, a wearable computer (for example, a head-mounted computer and/or a computer in communication with a head-mounted display), a smartwatch, and/or the like. As described below, the computing system 150 may display user interfaces, medical images, and/or the like, to a user via a display 155. Further, user input may be received via the computing system 150, for example selection of exams, images, annotations and/or the like, in response to which the information displayed may be updated. The computing system 150 may further be used by the user to create reports related to medical imaging exams.

The computing system 150 may include various components, including those illustrated in FIG. 1. Components may include sensors 170, which may include, for example, motion sensors, orientation sensors, and/or location sensors. The various sensors may include, for example, gyroscopes, accelerometers, compasses, cameras, Global Positioning System (GPS) transceivers and devices, near field communication (NFC) technology devices, Radio Frequency Identification (RFID) devices, systems and devices utilizing WiFi, systems and devices utilizing Bluetooth such as iBeacons, and/or the like. The various sensors may provide input/data to the computing system 150 related to the device's position, including the device's location, orientation, and/or motion. Such information may be processed by, for example, one or more software modules of the computing system 150.

As further described below, network environment 100 may include an image server 114 that stores exam and image information that may be processed by the system and/or displayed by computing system 150. The image server 114 may include image storage (for example, a data store, database, or storage system) that may be configured to store information, such as image data (also referred to herein as image and/or imaging information) (for example, images, image series, three-dimensional imaging data, and/or the like), that is processed by components of the network environment 100 (including, e.g., computing system 150), as described below. The image server 114 may additionally store information associated with images and/or exams, including, e.g., report and/or annotations.

The one or more scanners 110 may acquire image data (e.g., medical images, medical imaging data, medical image series, etc.) to be processed by the system and displayed to a user. Scanners 110 may include scanners of a variety of technologies, for example, computed tomography (CT), magnetic resonance imaging (MRI), ultrasound, nuclear medicine, positron emission computed tomography (PET), radiography, mammography, and/or the like. Additional examples and details of the scanners 110 are described below.

The network environment 100 also includes the PACS 112 that may be used to manage medical imaging exams, as described in further detail below.

The rules database 130 stores rules related to how newly generated medical images are to be created. These rules may be specific to users, user groups, and/or sites, and are also referred to herein as user preferences. Rules database 130 may comprise a database, data structure, file, etc. Rules may be executed by, for example, the rules engine 163 and/or another rules engine of a computing device and/or system of the network environment 100 (e.g., the PACS 112). Additional details regarding the rules database 130, rules, and rules engine 163 are described below.

The registration and matching processor 132 executes rules of the rules database 130 (via, e.g., the rules engine 163) so as to analyze medical imaging exams and determine exams to compare, to create a common frame of reference (e.g., using 3D registration techniques), and/or the like (and as further described below).

The 2D image generator 134 creates new, matched, 2D images or image series for an exam so that the new 2D images match 2D images or image series in another exam (so as to enable efficient comparison, as described below). New 2D images may be generated using, for example, any computerized advanced processing (CAP) technique (as described above, including multiplanar reformation/reconstruction (MPR)) and/or coordinate system information output from the registration and matching processor 132.

As described below, in various embodiments the various components of the network environment 100 may be combined into fewer components and/or separated into more components. In addition, functionality, process, methods, and operations described herein may be performed on other computing devices shown or not shown in FIG. 1. For example, operations related to the registration and matching processor 132 and/or 2D image generator 134 may be performed on other systems, e.g., the computing system 150 and/or the PACS 112.

IV. Generation of Matching 2D Images

FIG. 2 is a diagram visually illustrating an example process of generating 2D images from one exam that match 2D images of another exam. Two example exams are shown in FIG. 2, exam A and exam B, which a user (such as a reviewing physician) may desire to compare. For example, exam A may have been obtained at one time, while exam B may have been obtained later (e.g., a day, a month, or a year later). Accordingly, the physician/user may desire to determine actual differences between the exams by reviewing corresponding images from the two exams and comparing the corresponding images. As noted in FIG. 2, while the figure is described in reference to "exam A" and "exam B," in another example the two series, "series A" and "series B," may similarly be processed.

In the example shown, a series of 2D images, corresponding to slices of a patient's head, are obtained by the scanner in each exam. The 2D series of images may be derived from 3D volumetric imaging data obtained by the scanner via, for example, one or more CAP such as multiplanar reformation/reconstruction (MPR). However, 2D slices 210 from Exam B and 2D slices 220 from Exam A differ in terms of one or more image characteristics. As shown, the scan planes of the images 210 and 220 with reference to the anatomical structure of the patient are different. These different scan planes (and/or other artifactual differences between images of the exams) may be a result of, e.g., differences in patient position within the imaging scanner, differences in imaging scanner used and/or settings of the imaging scanner, and/or differences in how the 2D images are generated (e.g., how the plane of reconstruction and/or rendering of 2D images from a 3D volume is selected). Therefore, a user comparing a 2D image from exam A will not find an image from Exam B that matches in terms of its image characteristics. As described above, differences in image characteristics result in artifactual differences between images that make accurate and efficient comparison difficult as the same anatomical information shown in any given set of 2D images from Exam A and Exam B will appear different (even if there are no actual differences, e.g., changes in patient structure, physiology, anatomy, pathology, and/or the like).

As mentioned above, many imaging modalities allow acquisition of 3D volumetric information. This data may be used to mathematically generate new 2D images using, for example, MPR. Examples of imaging modalities that allow collection of 3D volumetric information include CT, MRI, PET, and ultrasound, just to name a few.

In the example of FIG. 2, volumetric imaging information 212 was acquired as part of Exam B. Using systems and methods described herein, new 2D images for Exam B may be generated from the volumetric data such that the new 2D images 214 match, or substantially match, the comparison images from Exam A with respect to their various image characteristics (including, for example, the image angle, patient rotation, and/or precise anatomical scan location). These new images are referred to herein as "matching 2D images." In some embodiments, as described below, matching 2D images may be dynamically generated on-the-fly (e.g., real-time or substantially real-time) for display to the user.

While the example of FIG. 2 uses 3D volumetric information to generate new matching 2D images, in other embodiments 2D image sets may be used to generate new matching 2D images.

In general, matching 2D images are images that have been corrected with respect to any image characteristics of one exam as compared to another exam.

Figure 3:
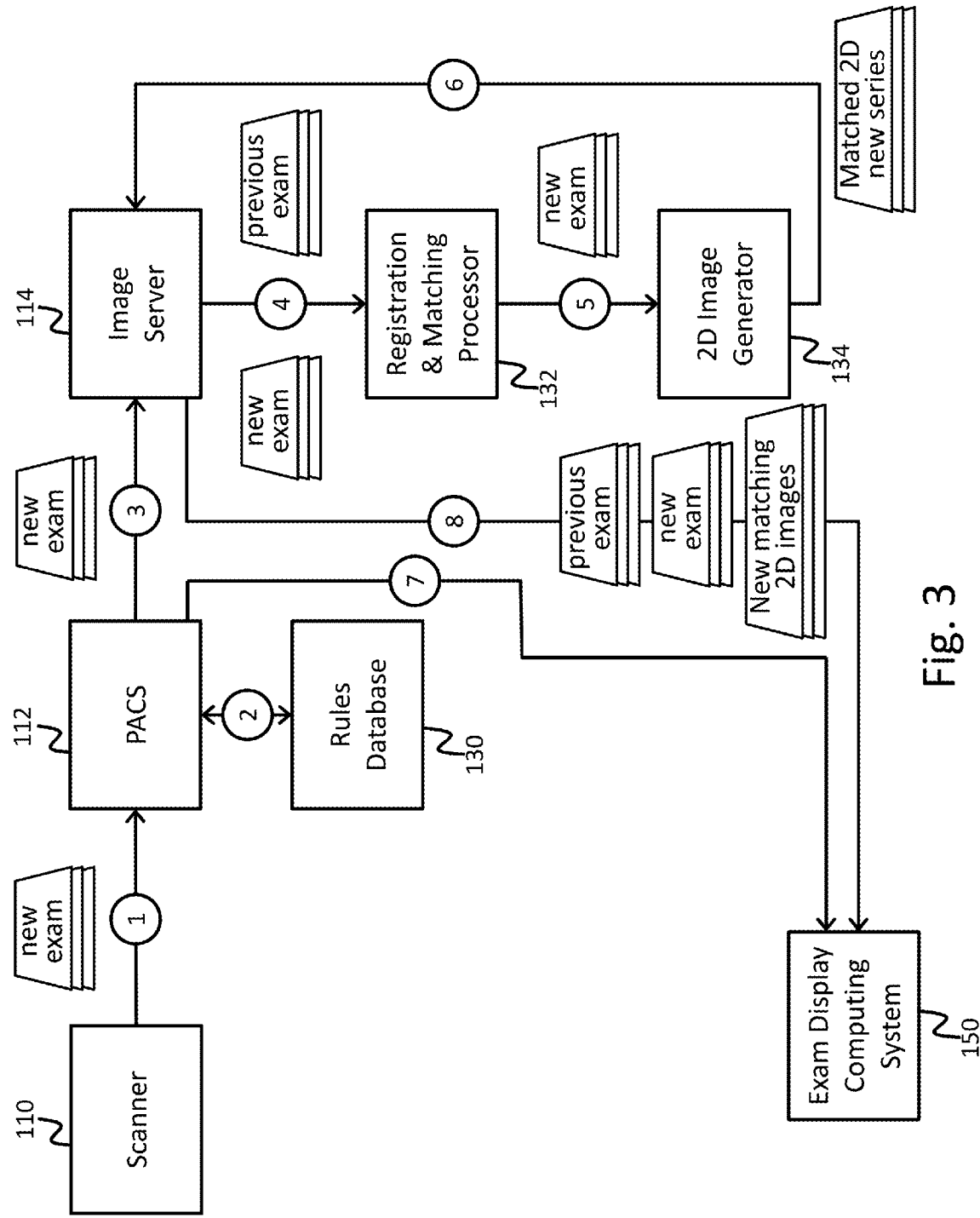
FIG. 3 is an action diagram illustrating a process of determining comparison exams and generating matching 2D images, according to embodiments of the present disclosure.

FIG. 3 is an action diagram illustrating an automated, rules-based process of determining comparison exams and generating matching 2D images, as executed by one or more components of the network environment 100. The example process of FIG. 3 makes use of rules stored by the rules database 130 to automatically determine exams for comparison, and generate matching 2D images.

In the example shown, new matching 2D images (e.g., series of matching 2D images) are generated from a new exam so that the new exam and an old exam (to be compared to) have 2D images with same or similar image characteristics. Alternatively, while not shown in FIG. 3, the system may generate new matching 2D images from an old exam so as to match images in a new exam.

In general, the process of FIG. 3 proceeds in eight actions, denoted by circled numerals, described below. In some embodiments, one or more of the actions may occur in a different order and/or concurrently, actions may be removed or additional actions added, and/or actions may be combined and/or subdivided.

Beginning at action 1, a new exam is communicated to the PACS. In this action a new exam obtained by, e.g., one of scanners 110 (or other source of medical imaging exams, such as a medical image management system, electronic medical record system, or personal health care system) is transmitted to the PACS 112.

Next, at action 2, rules for automated 2D series creation are retrieved from rules database 130. In this action, in response to receiving the new exam, the PACS 112 accesses rules from the rules database 130 that are used in the automated creation of matching 2D images. These rules include, for example, rules indicating which prior exam should be chosen as a comparison exam (for comparison with the new exam), and whether a new matching 2D series should be generated from the new exam or the comparison exam. Thus, based on the accessed rules, the PACS 112 may generate instructions that identify the new exam, identify the comparison exam, and indicate which exam is to be used to generate a matching 2D series. For example, the instructions may indicate that the new exam is to be used as a basis for generating a matching 2D series that matches the comparison exam. In another example, the instructions may indicate that the comparison exam is to be used as a basis for generating a matching 2D series that matches the new exam. Examples of rules for determining whether a new or comparison exam is to be used for generation of matching 2D series are described below in reference to FIG. 5.

Moving to action 3, the new exam is communicated to image server 114 with the instructions for new 2D series creation generated in action 2. The image server 114 stores the new exam, and additionally retrieves the previous exam (also referred to herein as the "old" exam) identified by the received instructions.

At action 4, the instructions, as well as the new and previous exams (or locations of the new and previous exams) are communicated to registration and matching processor 132. Based on the instructions, and an analysis of the exams, the registration and matching processor 132 generates data useable for generating 2D images such that images from the two exams are matched with respect to their various image characteristics. For example, the instructions may indicate that the new exam is to be matched to the previous exam. Accordingly, the registration and matching processor 132 may analyze images from the previous exam and the new exam to determine various adjustments to be made to various image characteristics of the images of the new exam such that generated 2D images from the new exam match 2D images of the previous exam. The registration and matching processor 132 may determine, for example, an exact offset in the angle, patient rotation, and/or precise anatomical location of images of the new exam as compared to the previous exam. The determined offsets in various image characteristics may be referred to herein as, e.g., "angle offset," "rotation offset," "location/position offset," and/or the like. Information regarding the adjustments to be made is referred to herein as "adjustment data." In one embodiment, this determined offset in the angle (e.g., "angle offset"), patient rotation (e.g., "rotation offset"), and/or precise anatomical location (e.g., "location offset" or "position offset") comprises adjustment data necessary to adjust the image characteristics of images of the new exam to match the image characteristics of the images of the previous exam. In another example, adjustment data may be determined that is useable to adjust images of the previous exam with respect to its image characteristics such that it matches images of the new exam. In some embodiments, adjustment data may be determined that is useable such that some image characteristics of images of both the new and the previous exam may be adjusted such that matching 2D images are generated from both the new and the previous exam.

Alternatively, the instructions and/or the new exam may be communicated from the PACS 112 directly to the registration and matching processor 132. In this alternative, the identification of the previous exam may be communicated to the image server 114 such that the image server communicates the previous exam directly to the registration and matching processor 132.

At action 5, assuming images of the new exam are to be adjusted to match the previous exam, the new exam and the adjustment data for adjusting the image characteristics of the images of the new exam are transmitted to the 2D image generator 134. The 2D image generator 134 then automatically generates matching 2D images via one or more of the methods described herein, including one or more CAP techniques. The generation of the matching 2D images makes use of the adjustment data, including, for example, coordinate system information output by the registration and matching processor 132, to correct the various image characteristics of images of the new exam with respect to the old exam. Alternatively, as mentioned above, images of the previous exam may be adjusted with respect to the new exam, and/or images from both exams may be adjusted with respect to one another, depending on the retrieved rules.

Next, at action 6, the matching 2D images are transmitted to the image server 114 for storage.

At action 7, a user utilizing the computing system 150 (which may be in communication with the PACS 112) may request display images of the new exam. The user may be notified that a comparison exam (e.g., the previous exam) with matching 2D images is available. The user may then choose to view both the comparison exam (e.g., the previous exam) and the new matching 2D images (corresponding to the new exam). Alternatively, based on rules, the chosen old (comparison) exam and the matching 2D series may be automatically chosen for display to the user upon request for the new exam, possibly with generation of the new images not even acknowledged to the user.

At action 8, in response to the user selection, the previous exam and the matching 2D images (and, in some cases, the new exam), are transmitted to the computing system 150 and displayed to the user for review.

In general, as described above in reference to FIG. 2, the exams and matching 2D images comprise series of images. However, in some instances the exams and matching 2D images may comprise a single image.

Figure 4:
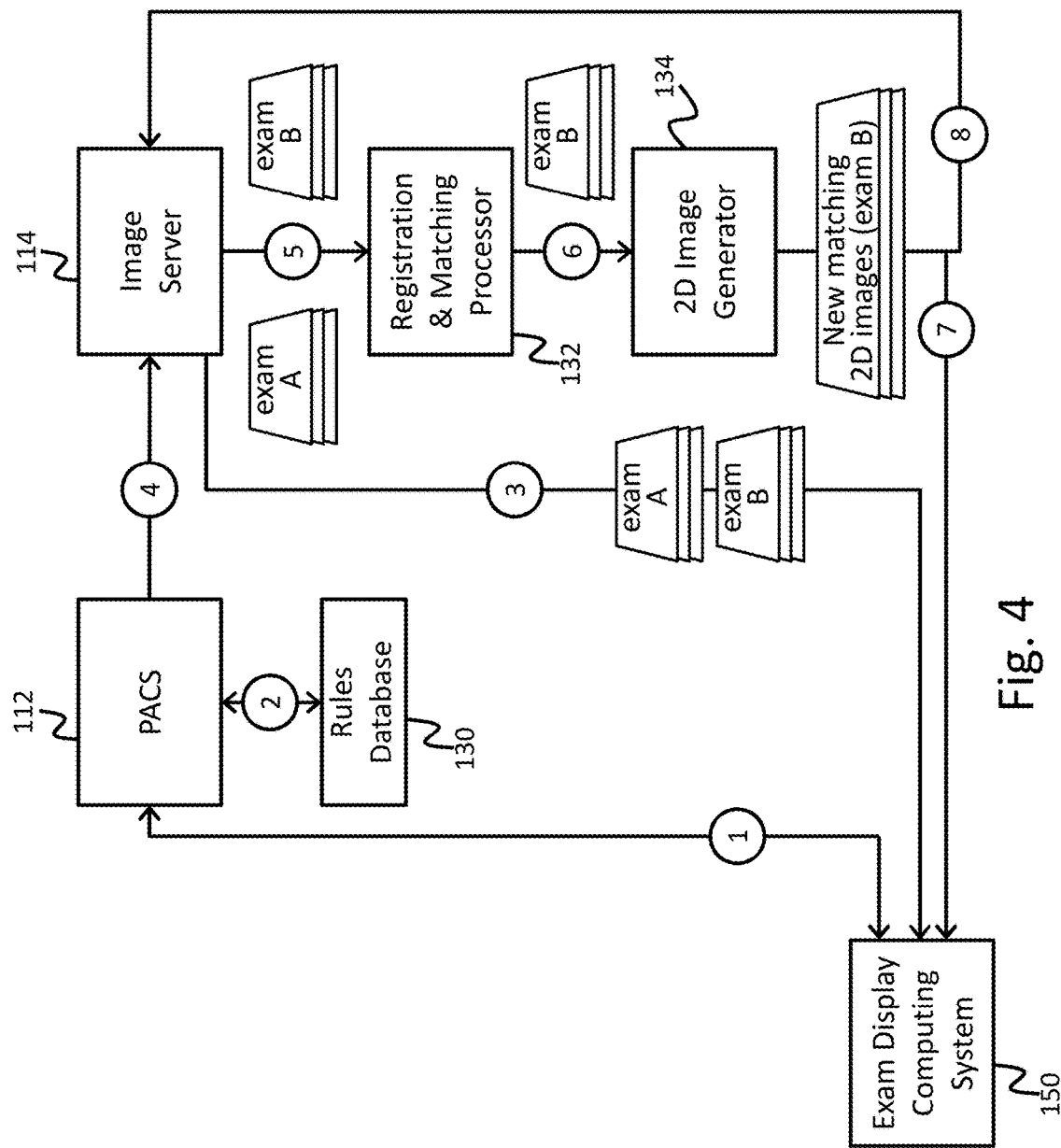
FIG. 4 is an action diagram illustrating another process of determining comparison exams and generating matching 2D images, according to embodiments of the present disclosure.

FIG. 4 is an action diagram illustrating a dynamic process of determining comparison exams and generating matching 2D images, as executed by one or more components of the network environment 100. While the process of FIG. 3 involves generating matching 2D images before a request by a user, the example process of FIG. 4 makes use of rules stored in the rules database 130 to automatically determine exams for comparison, and generate matching 2D images, upon request by the user (e.g., at the time the user views an exam).

In general, the process of FIG. 4 proceeds in eight actions, described below. In some embodiments, one or more of the actions may occur in a different order and/or concurrently, actions may be removed or additional actions added, and/or actions may be combined and/or subdivided.

Beginning at action 1, a user may interact with a user interface displayed on the computing system 150 to request two exams to view and compare. For example, a list of available exams may be communicated to the computing system 150 from the PACS 112 and displayed to the user. The user may then select exams to compare, which selection may then be transmitted to the PACS 112.

In some embodiments, the user may be presented with a list of new, or un-reviewed exams, from which to select. In response to a user selection of one of the exams, the system may then determine (based on, e.g., rules in the rules database 130) that there is a previous/old exam to which the new exam should be compared, and present that option to the user. The user's selection may then be transmitted back to the PACS 112.

In the illustrated example of FIG. 4, the user has selected to view and compare exam A and exam B.

At action 2, as in the example of FIG. 3, rules for automated generation of matching 2D images are retrieved from the rules database 130.

Next, at action 3, the requested exams may be communicated to the computing system 150 from the image server 114. The exams may be displayed to the user. Alternatively, the exams may not be displayed until matching 2D images are generated (e.g., action 7).

At action 4, similar to the example of FIG. 3, retrieved rules for the automated generation of matching 2D images are transmitted to the image server 114, along with the user's indication of the exams to compare (in this example, exams A and B). Based on the rules, subject to modification by the user, the exams to be matched are selected and retrieved. In addition, based on the rules, the system determines instructions indicating whether the matching 2D series is to be generated from exam A or exam B.

In action 5, as with the example of FIG. 3, the rules and the instructions and exams A and B are communicated to the registration and matching processor 132. Based on the instructions, and an analysis of the exams, the registration and matching processor 132 generates adjustment data useable to adjust the images of one or both of the two exams such that they are matched with respect to their various image characteristics. For example, the registration and matching processor 132 may determine, based on the instructions and the analysis of the two exams, that exam B is to be matched to exam A. The registration and matching processor 132 may then determine one or more adjustments of an offset in the angle, a patient rotation, and/or a precise anatomical location of images of exam B as compared to exam A. This determined adjustment data comprises the data necessary to adjust images of exam B such that they match images of Exam A.

Alternatively, the instructions may be communicated from the PACS 112 directly to the registration and matching processor 132, and the exams may be retrieved from the image server 114 by the registration and matching processor 132.

At action 6, adjustment data and one exam (as determined by the rules) is communicated to 2D image generator 134, similar to action 5 of FIG. 3, described above.

Moving to action 7, the newly generated matching 2D images (in this example, from exam B) are communicated to the computing system 150 and displayed to the user for comparison.

At action 8, the new matching 2D images are transmitted to the image server 114 for storage. This action may optionally be omitted based on user input with the user interface of the computing system 150 (for example, when the user does not want to save the matching 2D images). In an embodiment, the rules may be used to determine whether the newly generated matching 2D images are to be transmitted to and permanently archived by the image server 114.

FIG. 5 illustrates various example rules that may be executed by a rules engine of the system during execution of processes described above for determining comparison exams and generating matching 2D images. As described above the various rules may be stored in the rules database 130, and may be executed by rules engines of the PACS 112, the image server 114, the registration and matching processor 132, the 2D image generator 134, and/or the computing system 150. Execution of the rules may determine various aspects of the functionality of one or more components of the network environment 100, as described herein.

In various embodiment, individual rules, and/or sets of rules may be associated with particular users (e.g., particular physicians), types of users, characteristics associated with users, types of patients (whose exams are to be viewed), medical conditions of patients, locations of patients, characteristics associated with patients, characteristics associated with the computing system 150, sites where the computing system 150 is in use, groups associated with the computing system 150 and/or the user, and/or the like.

As described above, the rules include rules for determining which exams to compare, whether to automatically match exams, which exams to match, how to match the exams, and/or the like.

Referring to FIG. 5, examples of various rule parameters and values for those parameters is illustrated. A rule having one or more of the illustrated example rule parameters may be generated by the user, such as by the user selecting options for each of multiple rule parameters in a "new rule" user interface provided by the system, and then selecting required values for each of those rule parameters. Thus, a first rule may have a specific value for an exam type rule parameter (e.g., rule parameter 502) and a specific value for a comparison exam selection parameter (e.g., rule parameter 508), but no other user defined rule parameters. In such a case, default values for other rule parameters that are necessary for the system to complete the matching 2D image generation process may be used in the process.

The example rule parameter 502 may be used to indicate one or more exam types for which matching should automatically be performed. FIG. 5 includes example values for rule parameter 502, including that the processing indicated in other rule parameters of that particular rule are applicable to Brain CT, Brain MRI, Brain CT and MRI with a clinical diagnosis of hydrocephalus, and Brain CT and MRI with a clinical diagnosis of tumor. Use of an exam type rule parameter allows generation of new 2D images for only certain exam types and/or different processing of new 2D images based on the exam type. For example, multiple rules may be associated with different exam types and include different processing of those exam types as defined in other rule parameters of the corresponding rule.

Example rule parameter 504 indicates what should be done with a generated 2D series. Two example values for rule parameter 504 are illustrated in FIG. 5. A first example value for the rule parameter indicates that the generated 2D series should be stored temporarily for viewing by reading physician, and then archived at the user's request. A second example rule value for the rule parameter indicates that the generated 2D series should be automatically archived. Thus, in this example exams that match the exam type defined in rule parameter 502 will have matching 2D images generated and, depending on the value of rule parameter 504, may be temporarily stored for viewing (and then archived at the user's request) or automatically archived in the image server 114.

Example rule parameter 506 indicates what series type within an exam should be used for generation of a matching exam. In this example, the rule parameter indicates that for CT exams, pre and post contrast axial exams should be matched for comparison, while for MRI exams, 3D MPGR T1 (pre and post contrast) and T2 axial exams should be matched for comparison. Thus, for exams matching the values in rule parameter 502, the values of rule parameter 506 are applied to select the exam to be used for generation of a matching exam.

Example rule parameter 508 indicates which exam should be used as a comparison exam. Values for this rule parameter may include, e.g., most recent comparison exam of same region with same modality, most recent comparison exam of same region with "similar" modality (e.g., a brain MRI to be compared with a brain MRI or CT), and the exam chosen by the user. For example, when "most recent comparison exam of same region with same modality" is selected, the system will determine a previous exam from the same anatomical region and of a same modality for comparison with a new exam.

Example rule parameter 510 indicates, when generating the matching 2D series, which exam should be used. In the example of FIG. 5, multiple possible values for this rule parameter 510 are indicated, including, e.g., the old exam, the new exam, and "the exam with volumetric data available, old if available otherwise new." As noted above, in some embodiments available values for a particular rule parameter may be presented to a user for selection and/or may be generated by the user through selection of multiple criteria that further define the particular value.

In reference to rule parameter 510, the selection of one of the exams for generation of the matching 2D series may be based on various criteria and/or characteristics associated with the exams and/or image series. For example, in some instances generation of a 2D series of thin slices from a series with relatively thick slices, such as a 2D acquisition in MRI or thick section CT, may result in a significant loss in image quality. Accordingly, if only thick slices are available for both an old, read, exam and a new, unread, exam, it may be preferred to generate the matching 2D series from the old exam so as not to decrease quality of the new exam. Thus, the rule parameter 510 (or other rule parameter) may include criteria for determining the exam for generation of the matching 2D series based on slice thickness of the image series or other image quality parameter.

In some instances it is preferable to create a matching 2D series from a series with thin slices, typically a volumetric series. When only a new exam has a volumetric acquisition, then the matching 2D series may preferably be generated from the new exam.

In some instances it may be difficult to interpret an exam if a patient is asymmetrically imaged, for example tilted obliquely to the side. If one exam has the patient asymmetrically oriented, then it may be preferable to generate the matching 2D series from that exam to straighten out the patient alignment, regardless of whether that exam is old or new.

In some instances exams may be obtained according to a template that defines standard imaging orientations. For example, a template may be selected based on a patient's anatomy and/or exam type. For example, for a patient with scoliosis, a template may indicate that optimal sagittal imaging of the thoracic spine for the patient is slightly oblique relative to the patient's body. Selection of an exam for generation of a matching 2D series may be based on a determination of which exam is the furthest off from ideal, as indicated by the application template(s), particularly if volumetric acquisitions are available for both old and new exams. Thus, the rule parameter 510 (or other rule parameter) may include criteria for determining which exam could be better optimized to match a preferred position and/or orientation of the patient, such as by adjusting one or more image characteristics (e.g., applying a transformation to the alignment of the patient) and selecting the series requiring the most optimization for generation of the matching 2D series.

In some instances both exams may be reformatted (e.g., matching 2D series may be generated from both an old and a new exam) such that both the matching 2D series conform to standard "optimal" imaging orientations. For example, CT volumetric acquisitions might have been obtained with 0.6 mm slice thickness for both exams, but radiologists may desire to read the exams reformatted to 3 mm 2D sliced thickness in axial, coronal and sagittal orientations. In this instance, where both exams have volumetric acquisitions, both the exams may be processed to generate two matching 2D series such that the two matching 2D series match each other. Accordingly, a rule parameter may be configured to identify combinations of exams for which the user would like both exams reformatted, such as based on the acquisition slice characteristics, for example. In other embodiments, an indication of which of multiple image series are available for comparison may be presented to the user initially, along with an indication of which image series the system intends to reformat as a matching 2D series, at which point the user can adjust the default/automatic selection of the series selected for reformatting to select additional series for reformatting and/or change the series for reformatting.

Example rule parameter 512 indicates when a matching 2D series is to be generated. In this example, multiple possible values for this rule parameter 512 are indicated, including, e.g., automatically at the time a new exam is received by PACS, automatically at the time that a user displays an exam on the exam display computing device.

The rules parameters and values above are only provided as examples, and other rule parameters and/or values for rule parameters may be included in the rules database 130 and/or added to the rules database 130 by a user.

While the description above refers to matching of old and new exams, the system may similarly be used for matching two series from a same or different exams. Further, the system may be used to match more than two exams and/or series. For example, in some instances rule parameters may be set to match two or more series from the same exam that do not inherently have the same DICOM frame of reference. In one example, a single exam may include multiple head MRI series (and/or sets of imaging data). One series may be obtained initially, and then, during the procedure, the patient may be removed from the scanner, for example, to have intravenous contrast injected. The pre- and post-contrast images may then have different DICOM frames of reference. Thus, in this example, even though the exam includes series with different DICOM frame of reference, a rule parameter may be set to select the pre- and post-contrast images for comparison and to possibly perform reconstruction and/or rendering of at least one of the image series.

In some embodiments, DICOM frame of reference data may be provided from one exam (and/or series) to another matching exam (and/or series), such that the DICOM frame of reference match between the two exams/series and the images from the two exams/series may be easily compared and/or investigated. For example, by sharing DICOM frame of reference data between the two exams, the system may enable the user to do 3D targeting of locations in both exams or page through a series in one exam with the system automatically presenting images that show a same targeted point from the same or another prior exam.

Multiple image series selected for comparison (either by the system automatically and/or by the user) and/or matched to each other (e.g., a first image series and matching 2D image series associated with that first image series) may be displayed to the user in various ways. For example, images from the two matched image series may be sorted such that corresponding images from the two image series may alternately be displayed to a user in, e.g., a single image pane. In this ways, differences between corresponding images of the two image series may be efficiently and accurately compared. This, and other examples of selecting, sorting, and displaying images of multiple image series are described in detail in U.S. Provisional Patent Application No. 62/171, 866, filed Jun. 5, 2015, and titled "SYSTEMS AND USER INTERFACES FOR DYNAMIC INTERACTION WITH, AND COMPARISON OF, MEDICAL IMAGE DATA," the entire disclosure of which is hereby made part of this specification as if set forth fully herein and incorporated by reference for all purposes, for all that it contains.

V. Annotation of Matching 2D Images

FIGS. 6-10 illustrate example user interfaces and user interactions in which annotations from one image are added to a second matching image. As also mentioned above, according to various embodiments, the system disclosed herein may provide efficient and interactive user interfaces and user interactions by which a physician (or other reviewer of images) may add annotations to medical images. In an embodiment, the system may automatically add indications to a later acquired image, for example, that a corresponding earlier acquired image includes annotations. Additionally, the system may allow the physician to easily add and modify similar annotations to the later acquired image by selection of the indications.

Figure 6:
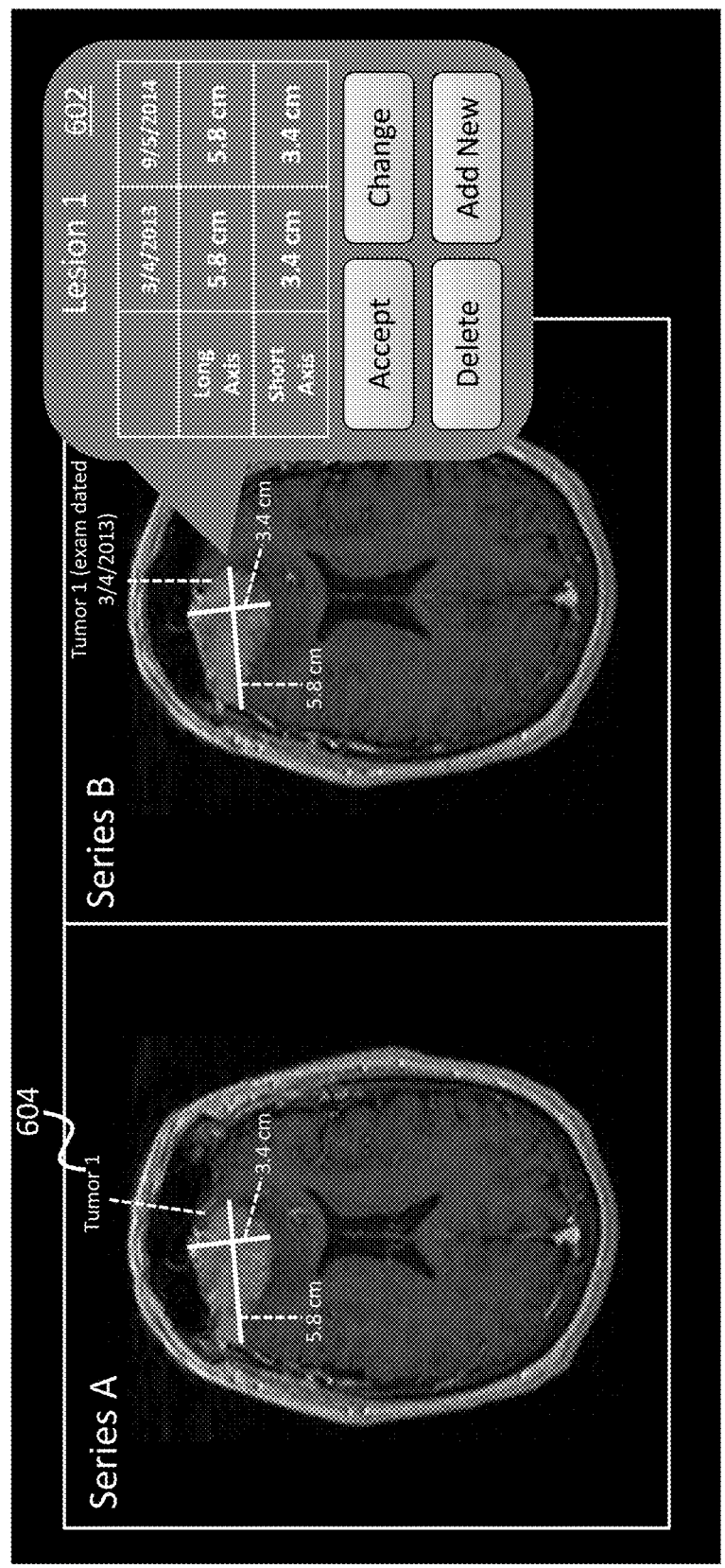
FIGS. 6-10 illustrate example user interfaces in which annotations from one image are added to a second matching image, according to embodiments of the present disclosure.

Referring to FIG. 6, images from two matched images series (e.g., exams) are shown in adjacent image panes of the user interface. In the example, the image from Series A (on the left of the display) was previously reviewed by a user and annotated to add the displayed measurements to the image. Further, the user has added a label 604 to the image of Series A. Subsequently, Series B was acquired and matched to Series A (as described above in, e.g., FIGS. 2-3). The matching images were then displayed to the user as shown. Previously added annotations (including the label and measurements) to the image of Series A may then be automatically added to the new matched image of Series B. Series A and Series B may be from a same exam, and/or may be from different exams (e.g., different exams that have been selected for comparison, as described above).

As shown, the measurements and label from the image of Series A may superimposed in a matching position of the matching image from Series B. The label is automatically updated to indicate the origin of the label (in this example, from the exam related to Series A). Additionally, a pop-up graphic 602 that displays information about the measurements may be displayed, as shown in FIG. 6. The pop-up graphic 602 may include selectable buttons for various options associated with the annotation.

In an embodiment, the user may use a mouse or other input device to change the measurement lines (and/or other annotation information added to the new matched image of Series B) and/or the label. The information may then be automatically updated in the image. Additionally, the user may delete the added annotations, and/or add additional annotations to the image. In some embodiments the system may include a bilinear measurement tool that the user may operate for measuring aspects of the images and/or to add annotations to the images. Example functionality and use of such a bilinear measurement tool are described in U.S. patent application Ser. No. 13/300,239, filed Nov. 18, 2011, and titled "ANNOTATION AND ASSESSMENT OF IMAGES" ("the '239 application") the entire disclosure of which is hereby made part of this specification as if set forth fully herein and incorporated by reference for all purposes, for all that it contains.

In various embodiments, and as described above, image annotation information may be incorporated into an image file directly, comprise metadata associated with the image file (for example, DICOM metadata information), associated with a report incorporating the image, and/or be stored in a separate location but linked to the image file in some way. For example, annotation information may be stored in a table (e.g., a database table) in the image server 114. Alternatively, the annotation information may be stored in the PACS 112.

Additionally, in some embodiments the system may execute one or more CAP on a displayed image in combination with identifying matching images and annotations. For example, the system may determine that one or more annotations in matching images indicate the presence of a lesion in a current image. Accordingly, the system may automatically process the current image to reassess the lesion. For example, the lesion may be automatically measured by the CAP, and the updated measurements may be automatically added to the current image (such as in the pop-up graphic 602 of FIG. 6). In other examples, the system may automatically find the volume, area, and/or stenosis of new lesions in a current image, and/or re-measure prior lesions from matched images. The CAP process may utilize the previous annotation information to more efficiently identify the presence, location, and type of a lesion so as to speed up, or make more accurate, the CAP. Such automatic CAP processing of the current image, combined with the indications of previous annotations and/or labels, may help the user more efficiently and accurately detect new findings in the current image.

In an embodiment, one CAP process of the system that may be automatically applied to images is a graphical reporting process. For example, a first exam of a patient may be a lumbar MRI, and the CAP process may automatically and/or semi-automatically find and/or outline lumbar discs in images of the first exam. Further, such finding and outlining may also be performed manually by a user. When a second exam of the patient is then viewed, the system may automatically match images to the first exam and graphically label (e.g., outline features graphically), optionally making use of one or more CAP, corresponding lumbar discs in images of the second exam. Alternatively, indications of the graphical outlines may be provided in the images of the second exam (as described below). Once added to the images of the second exam, for example, the user may efficiently adjust a graphical outline of the new disc outline/margin. In an embodiment, the CAP may automatically adjust the outline, and the system may provide an indication of the previous outline and the adjusted outline. Thereafter, the user may use the system to efficiently report the current (second) exam and issue a statement and/or generate a table that compares the graphical reporting information of second exam to the first exam (e.g., "the 4 mm right posterior disc protrusion seen at L4-5 has increased to 5 mm").

In an embodiment, the system may enable the user to efficiently and accurately add labels to an image and/or update labels automatically added to an image. In this embodiment, the system maintains a library of terms adhering to one or more configurable lexicons and/or structured value (and/or coded value) data sets. The lexicons and/or structured value data sets may be associated with one or more exam, series, or image attribute (and/or particular exams, series, and/or images). The lexicons and/or structured value data sets may alternatively, or in addition, be associated with user actions. As the user begins to add a label to an image (or update a label automatically added), the system may suggest terms drawn from the lexicons, and based on one or more of: information the user has provided (e.g., typed), information obtained from one or more CAP processes, and/or information obtained from one or more matched images and associated annotations. For example, in response to determining that an exam is a PET scan (which is commonly used for assessing cancer, for example), the system may present a user that has measured a lesion with a table of cancer terms from a lexicon, such as SNOWMED clinical terminology. Additional examples of adding and/or updating labels in an image are described in the '239 application, incorporated by reference above.

In an embodiment, the system may automatically assess a volumetric or 3D data set and automatically generate and present a 2D projection (e.g., a rendered 2D image) that shows, e.g., a maximum diameter of a lesion, and/or minimum diameter of a stenosis (among other indications that may be analyzed and presented). For example, a user may be paging through (e.g., flipping through in an image pane on an electronic display) an axial image series, note that an index lesion was automatically marked by the system, click a button to, e.g., "show the slice orientation that displays the maximum diameter of the tumor," and then click again to return to the axial display. Thus, the system may notify the user that a lesion was automatically found and marked, and in response to the user's selection, automatically display the rendered image that shows the maximum diameter of the lesion (and/or the minimum diameter of the stenosis).

In addition, the system may enable the user to perform a "free rotate" around an epicenter of the lesion/stenosis while synchronously controlling the next and one or more prior displays. For example, the user may provide a first type of input to rotate (e.g., left or right, or up and down) around a displayed lesion, in response to which the system automatically provides and/or renders the necessary images from a volumetric data set. Simultaneously, the user may provide a second type of input to change from one data set to another (e.g., from one exam to another exam), in response to which the system automatically provides and/or renders corresponding/matching images from other volumetric data sets (corresponding to other exams).

In another example, the system may enable the user to perform a "free rotate planar reconstruction" around an epicenter of the lesion/stenosis while synchronously controlling the next and one or more prior displays. For example, the user may provide a first type of input to indicate a point within a 3D volume and then provide input such that the plane of a cross-sectional image that is displayed through this point is rotated and actively controlled by the user's input. Therefore, for example, the user can dynamically change the angle of any cross-sectional image obtained through a particular point. The system may allow the user to synchronously display two or more volumes through the same anatomic region, which could be images form the same exam taken under different conditions or various different exams. When the user performs a "free rotate planar reconstruction" in this manner, the same action may synchronously apply to other volumes containing the matching designate point.

In an embodiment, various data (e.g., annotations, including labels, measurements, etc.), images, CAP information, etc. from various exams may be automatically harvested by the system for automated machine learning or other data analysis. For example, the system may analyze the exam data in order to provide feedback to the user. In another example, the system may analyze the exam data, including the CAP data such as the outlines of lumbar discs, in order to learn how to do things such as find the discs automatically, label the disk levels automatically, compare the discs automatically, provide the user feedback related to reporting trends, compare the user's reports to others (e.g. notify the user that "you are reporting a 45% incidence of disc extrusions, the average among neuroradiologists reporting lumbar MRI's in this age group is 11%"), and/or the like.

While the images of Series A and Series B are displayed in adjacent image panes in the user interface of FIG. 6, in other embodiments the images may be viewed separately from one another. For example, in an embodiment the user may view the image of Series B in a user interface with a single image pane, while the measurements of Series A are still automatically added to the image of Series B.

Figure 7:
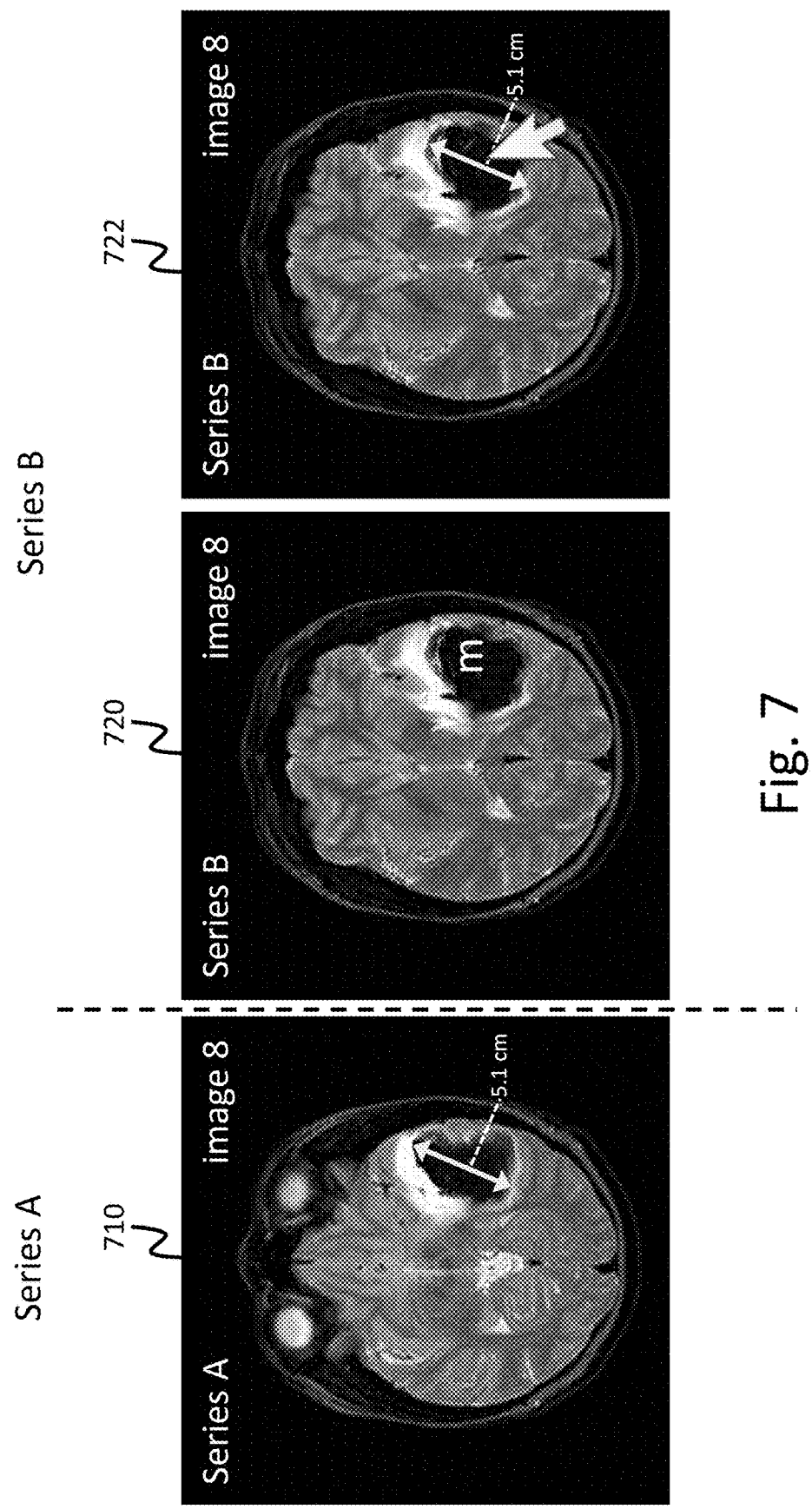

Referring to FIG. 7, images from two matched images series (e.g., exams) are shown. Image 710 from Series A includes a previous annotation including a measurement. Later acquired image 720 from Series B has been matched to image 710 and displayed to the user. In various examples, either or both of the images 710 and 720 may have been matched (e.g., registered) and/or rendered from volumetric data (e.g., via MPR).

As an alternative to automatically displaying previous annotations (from earlier reviewed images) in subsequently matched images, graphical indications of the existence of possible annotations of interest may be displayed. Such indications may alert the user that annotation(s) from a previous exam and associated with a particular area of the image is available, without covering as much of the image as the annotation(s) in full (e.g., pop-up graphic 602 of FIG. 6). The graphical indications may be representative of a type of the annotation. For example, a "*" may be shown to represent an arrow, an "m" may be shown to represent a measurement, an "a" may be shown to represent text, etc.

In the example image 720 of FIG. 7, an "m" is shown to indicate that a measurement was taken in the location of the "m" in one or more earlier matching images. In one embodiment, the user may hover over the "m" (with, e.g., a mouse cursor as shown) to cause the system to provide details of the measurement, as shown in image 722, and then indicate whether or not the annotation (in this example, the measurement) should be applied to the new image such as by double clicking, right clicking to see options, and/or the like. Another option that may be available to the user is to adjust a bi-linear measurement tool from a previous measurement to match the current area of interest, such as a tumor that has changed in size from a previous exam. Additionally, the user may add additional annotations to the image. In some embodiments, after selection of an indicated annotation, the user may optionally modify the selected annotation (e.g., by changing a measurement).

The example embodiment of FIG. 7 may be particularly useful to a reviewing physician when images from a matched exam are viewed separately from an earlier exam. This is because the physician would have no way of knowing that an earlier viewed exam included annotations that may be of interest unless the later exam is matched, and then indications are automatically added, as described. Advantageously, in this embodiment the user may easily select and/or hover a mouse cursor over the indication and thereby access the previous annotation information and easily add (and optionally modify) the annotation information to the later image.

In some embodiments, matched images from Series A and Series B may be displayed side-by-side in adjacent image panes in a user interface. In other embodiments, images of the image series may be viewed individually (e.g., in a single image pane in a user interface). Thus, for example, the user may view image 720 in a single image pane of a user interface (where the user interface does not include image 710). The system may then add with "m" annotation indication to the image 720, alerting the user to the presence of an annotation from a matched image (e.g., image 710, which is not currently visible to the user). Then, in response to selecting the "m" indication, the measurement may be added to the image, as shown in image 722 and as described above.

Figure 8:
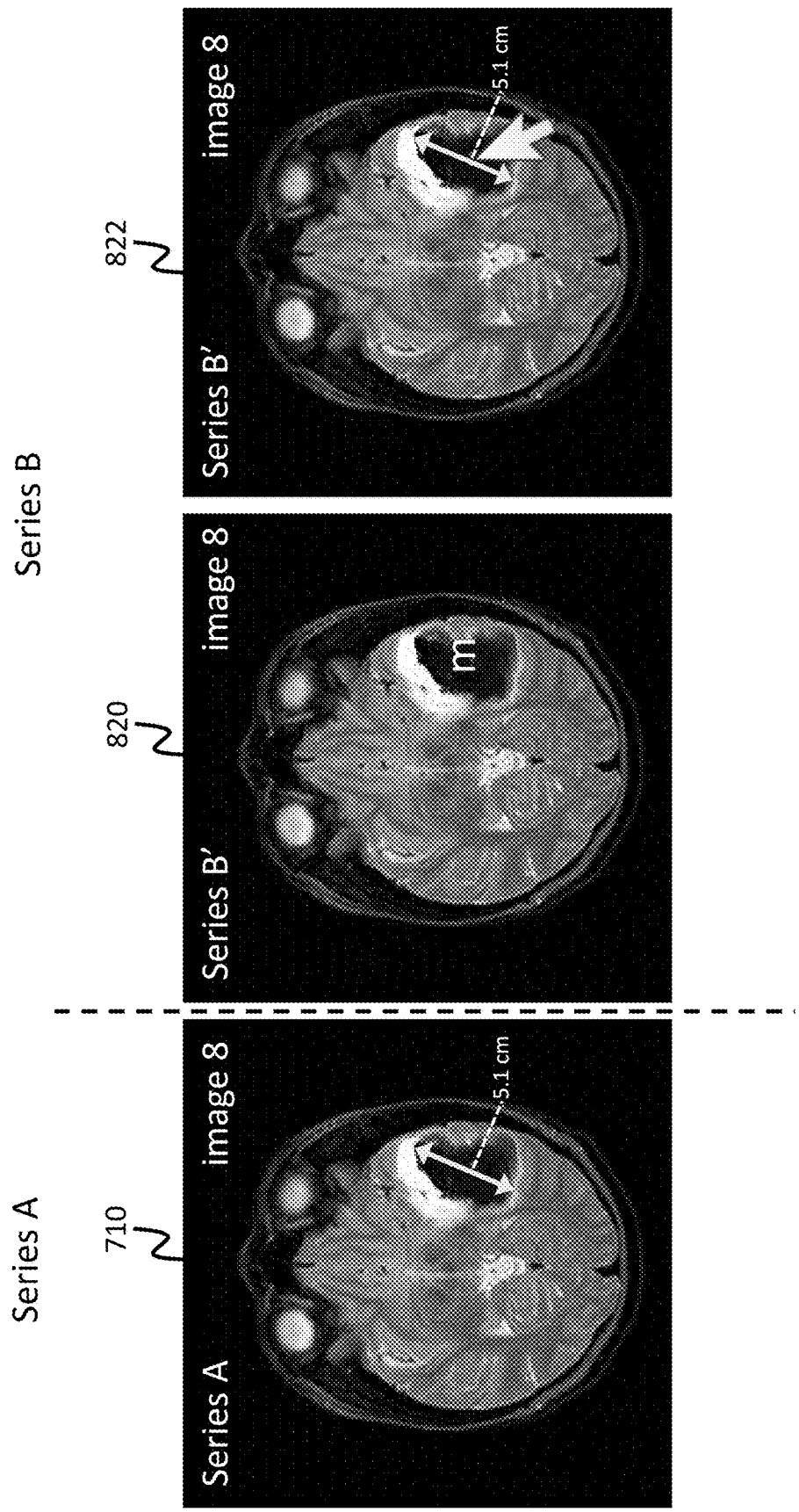

FIG. 8 is similar to FIG. 7, however in FIG. 8 the matched images of Series B have been reconstructed and/or rendered to generate images 820 and 822 (which correspond to previous images 720 and 722) that more exactly match the view of the image of Series A (as described above in reference to FIGS. 2-5). Matching of the image characteristics associated with the images from multiple exams allows annotations to be provided in later exams at more precise locations of images. Additionally, measurements made in later exams may be more accurately compared to measurements from the previous exam using the matched images.

Figure 9:
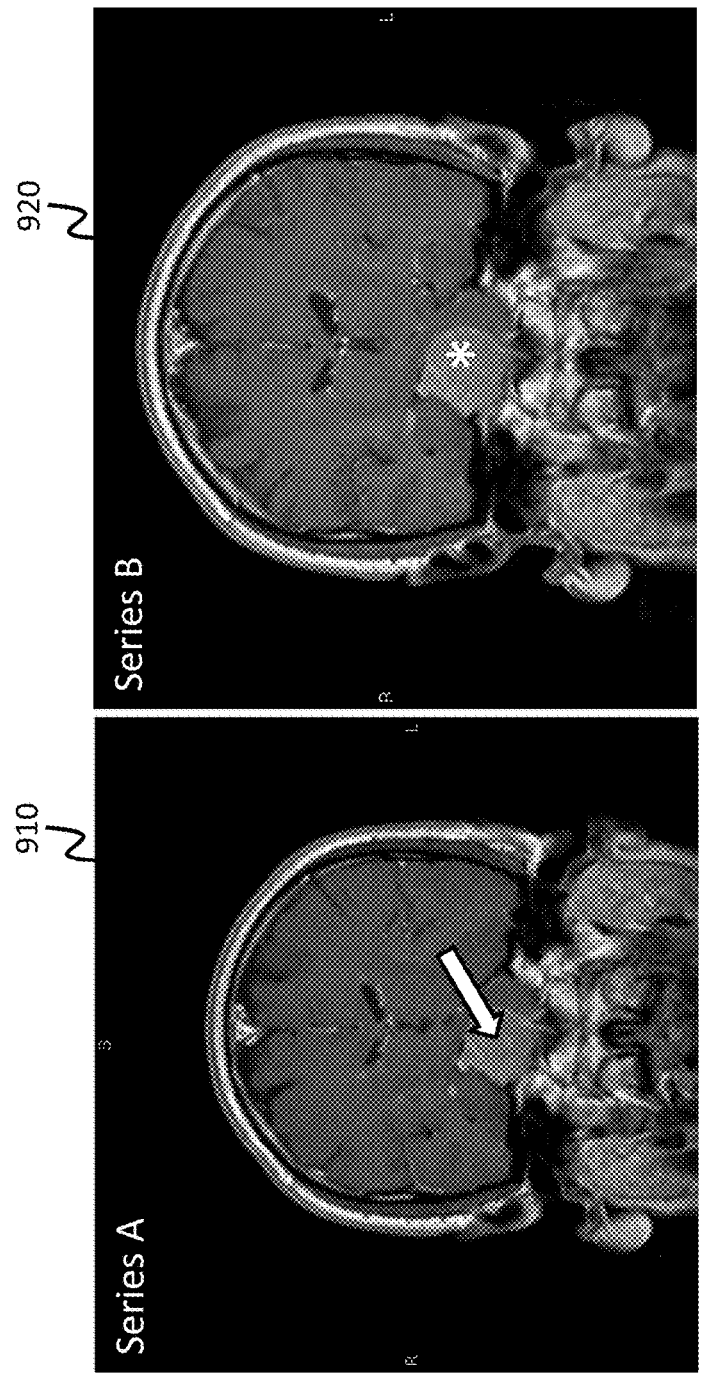

FIG. 9 illustrates another example of providing an indication of an annotation in a matched image. As shown, image 910 of Series A includes an arrow annotation. Accordingly, the system adds a "*" indication to matched image 920 from Series B to alert the user that an annotation was in that location in an earlier image series. In the example of FIG. 9, while image 920 may have a same frame of reference as image 910, the images may not be exactly matched (e.g., they may have differing fields of view, differing centering, etc.). However, despite these differences the annotation is provided in the matched images 920 in an accurate anatomical location corresponding to the annotated anatomical location in image 910.

Figure 10:
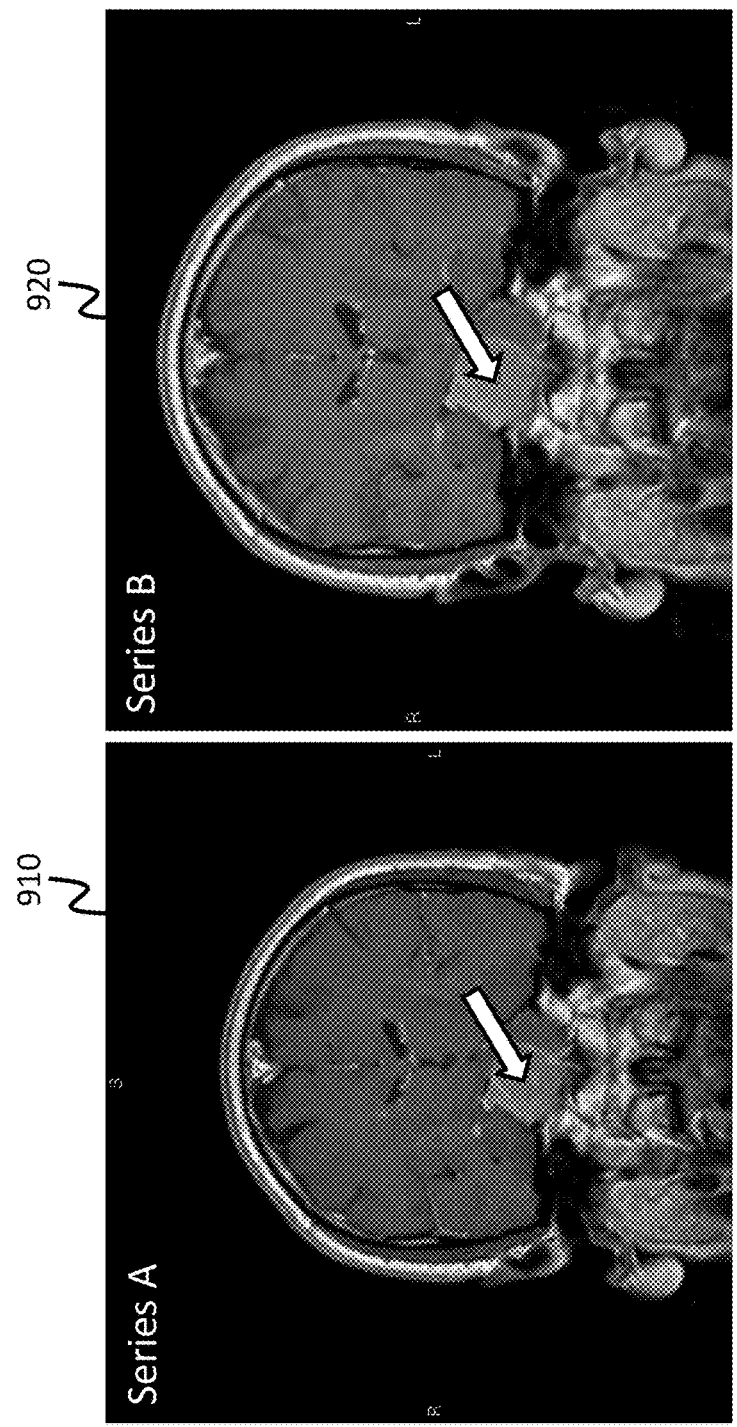

FIG. 10 is similar to FIG. 9, and illustrates an example user interaction process that may be used to add the annotation to the matching image. In the example shown, the user may hover a mouse cursor over the "*" and preview the annotation that may be transferred to the matching image 920. If the user clicks on the "*", it is replaced with the arrow in this example. A similar process can apply to measurements and other types of annotations. In some embodiments, once an indication of an annotation is selected and the annotation is added to the matching image, the annotations in the two respective images are partially unassociated from each other such that the annotations may be independently adjusted in either image. Alternatively, adjustments of an annotation in either image may cause corresponding updates to the corresponding annotation in the other image. In another embodiment, adding a new annotation to either image, or adjusting an added annotation (e.g., from an indication of an existing annotation) in either image, causes a corresponding indication of the new annotation/adjusted annotation to be provided in the other image.

As with the other examples and embodiments described above, in various embodiments the images of FIGS. 9 and 10 may or may not be displayed adjacent to each other in image panes of a user interface. For example, in some embodiments the user may view image 920 in a single image pane of a user interface (where the user interface does not include image 910). The system may then add with "*" annotation indication to the image 920, alerting the user to the presence of an annotation from a matched image (e.g., image 910, which is not currently visible to the user). Then, in response to selecting the "*" indication, the measurement may be added to the image, as shown in image 920 of FIG. 10 and as described above.

In various embodiments, annotations from multiple matching images (e.g., from multiple exams or series) may be added to and/or indicated on an image. For example, a current image of a current exam may be matched to two or three (or more) other images from one or multiple prior exams. Accordingly, annotations for the matching images of the prior exams may be added to and/or indicated on the current image.

In various embodiments, indications of annotations from matching images may be provided in locations other than on a displayed image. For example, an indication may be provided adjacent to a displayed image, as described below in reference to FIGS. 12A-12C.

In some embodiments, annotations (e.g., measurements) from new and prior exams (e.g., a current exam and one or more matched exams) can be assembled into a table, optionally organized by date or some other attribute, and stored and/or mapped into a clinical report for later reference and/or exporting.

In some embodiments, indications of annotations may be added to matching images based on one or more rules. For example, a rule may indicate that an indication of an annotation should be added if one or more characteristics (such as the image plane, the modality, the imaging technique, the field of view, and/or the like) of the matching image match the earlier image. As shown in FIG. 9, image 920 matches the frame of reference of image 910, but the field of view and centering are slightly different. However, the indication of the annotation is added to the image 920 according to rules.

In various embodiments, the rules associated with automatically annotating (or adding indication of annotations to) matching images may be associated with specific users, user groups, and/or sites, and are also referred to herein as user preferences. As with the rules described above, the rules associated with annotations may be executed by, for example, the rules engine 163 and/or another rules engine of a computing device and/or system of the network environment 100 (e.g., the PACS 112).

FIG. 11 is a flowchart illustrating an example method of providing annotations from previous exams in a later exam, as well as other related features, according to one embodiment. In the example method of FIG. 11, various blocks may be added or removed, and/or performed in an order different than is shown. The method of FIG. 11 may be performed by various components of the network environment 100, such as the registration and matching processor 132, the PACS 112 in communication with the computing system 150, and/or an annotation module that is part of modules 151 of computing system 150.

At block 1102, two exams are selected for comparison (either manually or automatically, such as by automatically selecting a previous exam based on a relationship with a user-selected exam) and matched 2D images are generated (if necessary), as described above in reference to FIGS. 2-5. At block 1104 an indication of images for comparison is received by the system. For example, a user may select a particular image of an exam to compare to a corresponding image from a previous exam. For example, a user may flip through images of either of the exams that are being compared in order for the process to continue to block 1106.

At block 1106, the system determines whether an annotation exists in the first image. As noted above, annotations may be stored in the actual image file, a corresponding exam file, metadata associated with the image, a table of annotation data, and/or other data structure (as described above). Thus, annotations may be located by accessing any of the annotation sources noted above.

At block 1108, a corresponding annotation, or indication of such an annotation, is added to the matching second image in a location corresponding to the annotation location in the first image (e.g., a same anatomical location). As described above, the indication of the annotation may be descriptive of the type of annotation. Additionally, as described above, in an embodiment, the annotation/indication may be added to the second matching image depending on particular rules and based on characteristics associated with the second matching image.

At block 1110, in response to user input, the annotation may be added to the second matching image, as described above.

At block 1112, the annotation may be modified in response to user input.

At block 1114, the annotation may be recorded and/or stored according to one of the methods described above.

In an embodiment, measurement annotations may be automatically resized in matching images based on analysis of, e.g., changes in lesion size in the matching images.

In some instances, as described above, two or more exams and/or image series may be matched to one another even when they do not have a matching DICOM frame of reference. In such instances, while the DICOM frame of reference may not match between the matched series, annotations may be added and matched between them, as described above. For example, if a user places an annotation, arrow, or otherwise marks a lesion on one series of images, the system may automatically mark images of the other series even when the other series does not have the same DICOM frame of reference. The system may perform automated analysis (e.g., one or more CAP, such as automated detection of anatomical features, etc.) of images to determine accurate locations for marking images of other such series.

In some embodiments, the system may automatically pre-mark annotations, arrows, and/or other marks on a current exam that match the location of such marks on a prior exam, as described above.

In some embodiments, when a prior exam's lesions are marked with an index number (or other identifier), the current exam lesions may automatically be marked with the same index number (or other identifier). Examples of indexing of items (such as lesions) in medical images are described in the '239 application, which is incorporated by reference herein above.

In some embodiments, the system may automatically store and present (to a user) information about a current exam that informs a user which series, and/or which images in a series, contain which indexed lesions and/or other marks. Thus, for example, the user may open a new, matched exam and/or image series, and may be presented with information indicating where various automatically added annotations (that indicated items identified in previous exams, as described above) are located (e.g., which series and/or images in the matched exam include annotations). The user may thereby quickly navigate to the most relevant series and/or images.

In some embodiments, annotation information (such as the various annotation information described above) may be stored in, and available from, a database (or other data store). Further, such annotation information may be accessed from the database and may be moved into a clinical report.

In some embodiments, image characteristics from two selected series may not be adjusted such that the series match, but the series may nonetheless be marked with annotations and/or provided with matching DICOM frame of reference data, as described above. For example, in these embodiments the system may determine two exams to be compared, may not perform generation of a new 2D or 3D series, may determine a common DICOM frame of reference and/or automatically determine related images between the series (e.g., by one or more CAP), and may automatically pre-mark and/or annotate a new exam based on a previous exam's markings and the common DICOM frame of reference and/or determined related images. Thus, the system may enable the user to do 3D targeting of locations in both exams or page through a series in one exam with the system automatically presenting images that show a same targeted point and related annotations from the same or another prior exam.

Figure 12A:
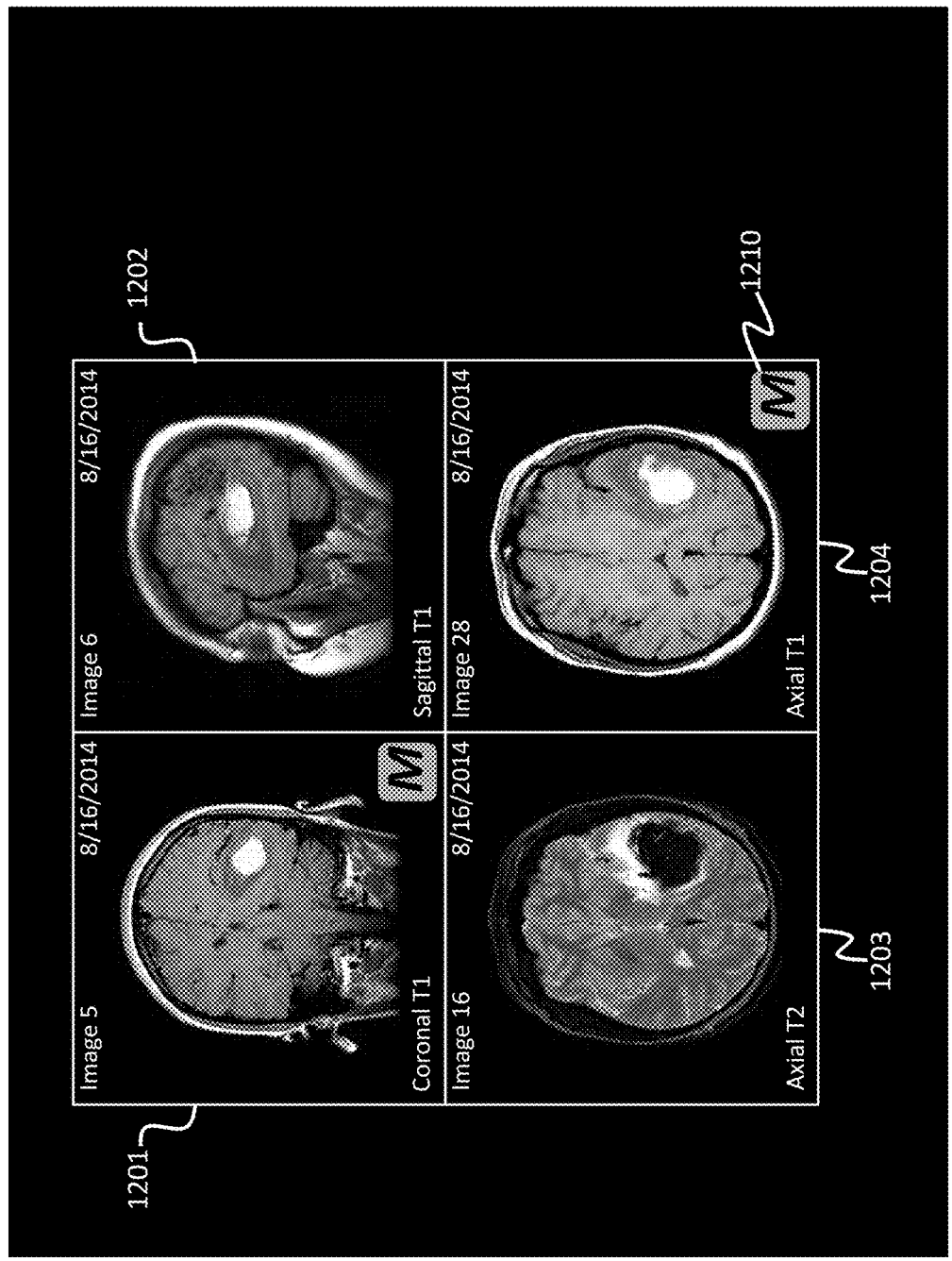
FIGS. 12A-12C illustrate additional example user interfaces in which annotations are added to images, according to embodiments of the present disclosure.
Figure 12B:
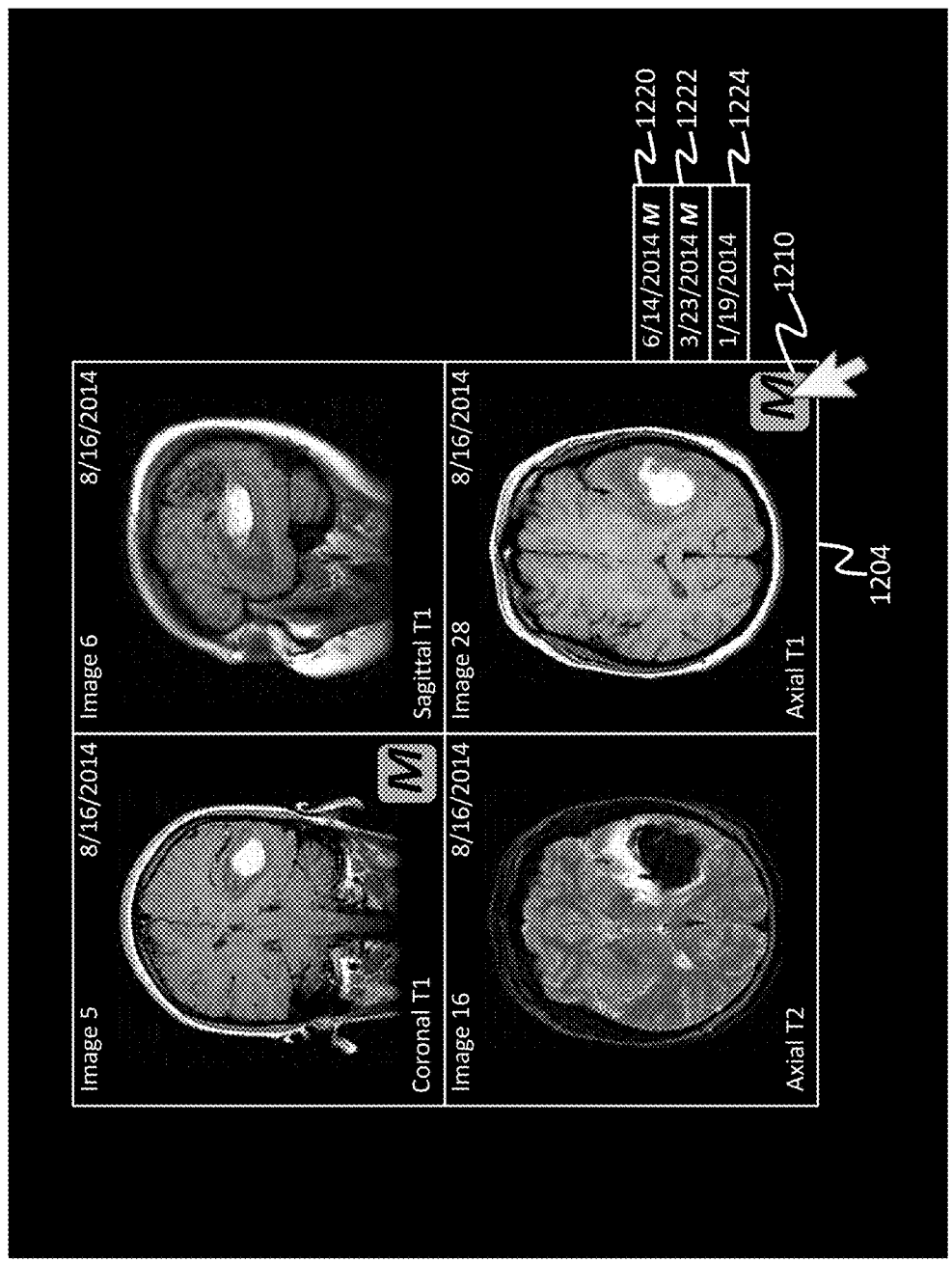
Figure 12C:
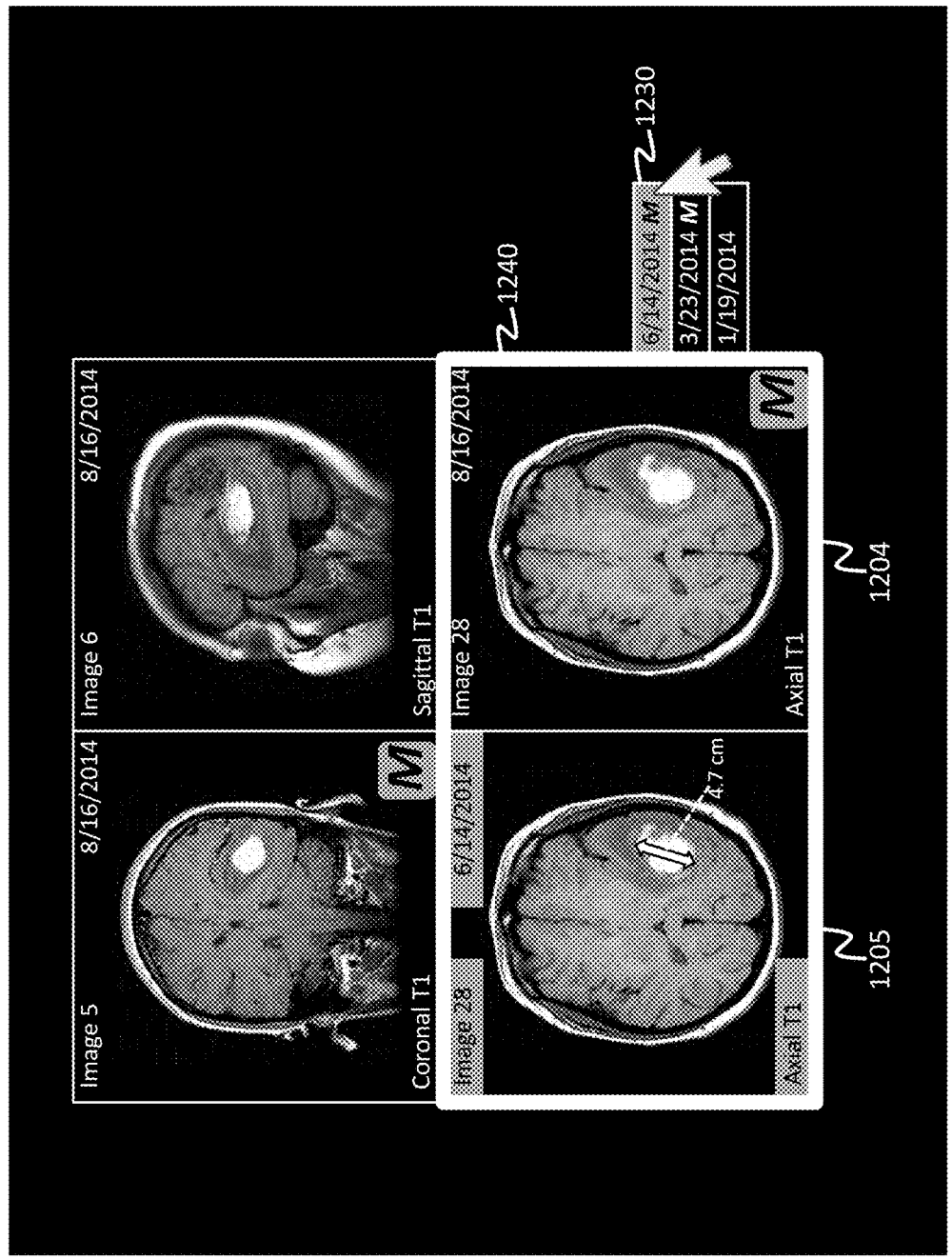

FIGS. 12A-12C illustrate additional example user interfaces and user interactions in which annotations are added to images, according to embodiments of the present disclosure.

Referring to FIG. 12A, a user interface is shown in which four images from four different image series of an exam of a patient dated Aug. 16, 2014 are shown in four adjacent image panes (1201, 1202, 1203, and 1204). As described above, the displayed exam may be matched to one or more previously and/or subsequently obtained exams, and indications from annotations from matching images of those matched exams may be provided in corresponding images of the displayed exam. In the present embodiment, rather than providing an indication of an annotation directly on an image, a visual indicator that one or more annotations are available may be provided in relation to the image. In the example of FIG. 12A, a visual indicator 1210 superimposed on a lower right corner of image pane 1204 indicates that one or more other exams of the patient have a measurement (or other annotation) in a matching image. Image pane 1201 also has such a visual indicator, indicating that other images from one or more other exams of the patient that match the image in image pane 1201 also include annotations. In other embodiments, the visual indicator could take another form or be positioned elsewhere. For example, in an embodiment the displayed image and/or image pane may be outlined and/or highlighted to indicate an annotation is available.

Referring to FIG. 12B, the user has provided a user input to select the "M" indicator 1210 (e.g., the user may position a cursor over the indicator and/or may touch the indicator via a touch screen user interface). In response, the system provides a list of other matched exams, and their associated exam dates, with matching images displayed as buttons 1220, 1222, and 1224. In the example, the buttons are displayed to a right of the image pane, but may alternatively be displayed elsewhere on the screen. Buttons 1220 and 1222 of the the list of other matched exams include an "M" indicator (in other embodiments, other indicators may be provided), indicating that these other matched exams include at least one matching image that has an annotation.

Referring to FIG. 12C the user has positioned the cursor over (or otherwise provided input to select) one of the buttons (in the example, button 1230). In response, the system automatically performs two operations. First, an appearance of the button 1230 is changed to indicate that the matched exam associated with the button has been selected. In the example shown, a color and text of the button 1230 are changed, but in other examples other appearance changes may be made. Second, a matching image from the other matched exam (e.g., exam Jun. 14, 2014 associated with the selected button) corresponding to the image of image pane 1204 is automatically displayed in new image pane 1205. The image pane 1205 temporarily replaces the previously displayed image in image pane 1203.

Optionally, a visual indicator such as thick frame 1240 surrounding the current image (of image pane 1204) and its matching image (of image pane 1205) may be shown to indicate a comparison mode. In various embodiments, the matching image may be overlaid in other locations and/or in other image panes of the user interface such that the user may compare the matching image to the current image.

As shown, the matching image shown in image pane 1205 includes an annotation (e.g., a measurement). In one embodiment, the annotation may be automatically copied to the current image, for example by right clicking on the current image and selecting "copy measurement from Jun. 14, 2014." An annotation added to the current image may then be modified as described above with reference to FIGS. 6-10. Alternatively, a selectable indication may be provided in the current image, as described above with reference to FIGS. 6-10. Various other functionality of the system as described above may also be provided in the user interface of FIG. 12C.

The user may additionally provide user inputs to select other of the displayed buttons 1220, 1222, and 1224, so as to cause the system to display other matching images from other matched exams. In an embodiment, the user may roll a mouse scroll wheel to rapidly navigate through the list of matching exams and view each of the corresponding matching images, essentially scrolling through time.

Accordingly, in various embodiments, the user interfaces of FIGS. 12A-12C provide a visual indicator when any matching exams have matching annotations, and allow the user to efficiently navigate through the matching images from the matching exams. As described above, multiple matched exams (including, in an embodiment, all matched exams) may be automatically matched. In an embodiment, only matched images from a most recent matched exam may be automatically displayed. Further, advantageously, in the example user interfaces of FIGS. 12A-12C, the visual indicator is not superimposed on the anatomy within the image, thus not obscuring a portion of the image from the user's view.

In an embodiment, multiple prior annotations from each of multiple prior matching exams may be indicated.

VI. Example Computing Devices and Systems

The computing system 150 (FIG. 1), as well as the other computing devices discussed herein, may be configured for managing and/or displaying information utilizing certain systems and methods described herein, according to various embodiments.

The computing system 150 may take various forms. In one embodiment, the computing system 150 may be an information display computing device, and/or a computer workstation, having software modules 151. In other embodiments, software modules 151 may reside on another computing device, such as a web server or other server, and a user directly interacts with a second computing device that is connected to the web server via a computer network.

In one embodiment, the computing system 150 comprises one or more computing devices, such as a server, a desktop computer, a workstation, a laptop computer, a mobile computer, a smartphone, a tablet computer, a cell phone, a personal digital assistant, a gaming system, and/or any other device that utilizes a graphical user interface.

The computing system 150 may include various components including, for example, one or more processors 152, memory and/or data storage 153 (including one or more software modules 151), an operating system 154, a display 155, one or more input devices 156, one or more interfaces 157, an audio input/output 158, and/or one or more sensors 170. Each of the components of the computing system 150 may be connected and/or in communication with each other using, for example, a standard based bus system. In different embodiments, the standard based bus system could be Peripheral Component Interconnect ("PCI"), PCI Express, Accelerated Graphics Port ("AGP"), Micro channel, Small Computer System Interface ("SCSI"), Industrial Standard Architecture ("ISA") and Extended ISA ("EISA") architectures, for example. In addition, the functionality provided for in the components and modules of computing system 150 (as described above and below) may be combined into fewer components and modules or further separated into additional components and modules. In some embodiments, the PACS 112, the registration and matching processor 132, rules database 130, and/or the 2D image generator 134, and/or aspects of the functionality of one or more of these components, may be implemented in the computing system 150.

Regarding the registration and matching processor 132 and 2D image generator 134, each of these computing devices may include various components similar to the computing system 150 so as to accomplish the functionality described above. For example, the registration and matching processor 132 may include a processor, memory, and one or more software modules, such as the rules engine 163, that may be executed by the processor. Similarly, the 2D image generator 134 may include a processor, memory, and one or more software modules to generate 2D images from other 2D or 3D image data, as described above.

As mentioned above, the rules database 130 may include various rules (as described in reference to, for example, FIG. 5) that may be executed by components of the system, including the rules engine 163 and/or an analogous rules engine of the PACS 112, the 2D image generator 134, and/or the computing system 150.

In various embodiments, the various software modules of the system may provide functionality as described above with reference to the various figures. For example, modules 151 of the computing system 150 may include image display modules, rules engine modules, and/or the like. Modules of the registration and matching processor 132 may include, for example, the rules engine 163 and/or a rules engine of the PACS 112. These various modules may function to execute rules stored in the rules database 130 and/or perform various other functions such as determining exams to be compared, generating matching 2D images, transferring images, displaying images, generating user interfaces, receiving user inputs, reading and/or generating annotations, and/or the like.

In an embodiment, the rules database 130 may be incorporated into any other component of the system, including, for example, the image server 114, the PACS 112, the registration and matching processor 132, and/or the 2D image generator 134.

In an embodiment, the rules database 130 may be implemented as one or more databases. Other databases and data stores of the system may similarly be implemented as one or more databases.

As described below, the various software modules may include various software instructions, code, logic instructions, and/or the like that may be executed by one or more processors (e.g., processor(s) 152) to accomplish the functionality described above. In other embodiments, software modules may reside on other computing devices, such as a web server or other server, and a user may directly interact with a second computing device that is connected to the other computing device via a computer network.

The computing system 150 (and/or other computing devices and/or systems of the network environment 100) may run an off-the-shelf operating system (e.g., operating system 154) such as a Windows, Linux, MacOS, Android, or iOS. The computing system 150 may also run a more specialized operating system which may be designed for the specific tasks performed by the computing system 150.

The computing system 150 (and/or other computing devices of the network environment 100) may include one or more computer processors (e.g., processor(s) 152), for example, hardware computer processors. The computer processors may include central processing units (CPUs), and may further include dedicated processors such as graphics processor chips, or other specialized processors. The processors may be used to execute computer instructions based on the modules to cause the computing devices to perform operations as specified by the modules. The modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. For example, modules may include software code written in a programming language, such as, for example, Java, Objective-C, Swift, JavaScript, ActionScript, Visual Basic, HTML, Lua, C, C++, or C#. While "modules" are generally discussed herein with reference to software, any modules may alternatively be represented in hardware or firmware. In various embodiments, the modules described herein refer to logical modules that may be combined with other modules or divided into sub-modules despite their physical organization or storage.

As mentioned above, the computing system 150 (and/or other computing devices and/or systems of the network environment 100) may also include memory (e.g., memory 153). The memory may include volatile data storage such as RAM or SDRAM. The memory may also include more permanent forms of storage such as a hard disk drive, a flash disk, flash memory, a solid state drive, or some other type of non-volatile storage.

Display devices 155 of the computing system 150, may include a video display, such as one or more high-resolution computer monitors, or a display device integrated into or attached to a laptop computer, handheld computer, smartphone, smartwatch, computer tablet device, or medical scanner. In other embodiments, the display device 155 may include an LCD, OLED, or other thin screen display surface, a monitor, television, projector, a display integrated into wearable glasses, or any other device that visually depicts user interfaces and data to viewers. As described above, images and other information may be displayed to the user via the display devices 155 such that the user may efficiently view and interact with such images and information.

The computing system 150 may also include or be interfaced to one or more input devices 156 which receive input from users, such as a keyboard, trackball, mouse, 3D mouse, dial and/or knob (for example, a smartwatch crown), drawing tablet, joystick, game controller, touch sensitive surface (for example, capacitive or resistive touch screen), touchpad, accelerometer, video camera and/or microphone.

The computing system 150 may also include one or more interfaces 157 which allow information exchange between computing system 150 and other computing devices and input/output devices using systems such as Ethernet, Wi-Fi, Bluetooth, as well as other wired and wireless data communications techniques.

The computing system 150 may include the audio input/output 158 for, for example, receiving audio commands or other input from the user and/or providing audio output. The computing system 150 may further include various sensors 170. As described above, the various sensors may include, for example, gyroscopes, accelerometers, compasses, cameras, Global Positioning System (GPS) transceivers and devices, near field communication (NFC) technology devices, Radio Frequency Identification (RFID) devices, systems and devices utilizing WiFi, systems and devices utilizing Bluetooth such as iBeacons, and/or the like. The various sensors may provide input/data to the computing system 150 related to the device's location, position, orientation, and/or motion. Such information may be processed by, for example, one or more software modules 151 as described above.

The computing system 150 may communicate and/or interface with other systems and/or devices. In one or more embodiments, the computer device 150 may be connected to the network 190. The network 190 may take various forms. For example, the network 190 may be a wired network or a wireless network, or it may be some combination of both. The network 190 may be a single computer network, or it may be a combination or collection of different networks and network protocols. Additionally, the network 190 may include one or more local area networks (LAN), wide area networks (WAN), personal area networks (PAN), cellular or data networks, and/or the Internet.

Various devices and subsystems may be connected to the network 190, as shown in FIG. 1. Rules database 130 and/or the image database of the image server 114 may be databases, data stores, or other electronic or computer-readable medium storage devices configured to store, for example, rules, medical images, and/or three-dimensional imaging data. Such rules, medical images, and/or three-dimensional imaging data may be processed, for example, by the PACS 112, image server 114, registration and matching processor 132, 2D image generator 134, and/or computing system 150.

The various components of the network environment 100 may be in communication with various other devices that may, for example, capture and provide images and/or other data to the computing system 150, the image server 114, the registration and matching processor 132, and/or the 2D image generator 134. For example, scanners 110 may comprise one or more medical scanners that may be connected, such as MRI scanners. The MRI scanner may be used to acquire MRI images from patients, and may share the acquired images with other devices on the network 190. The network 190 may also include one or more CT scanners. The CT scanners may also be used to acquire images and, like the MRI scanner, may then store those images and/or share those images with other devices via the network 190. Any other scanner or device capable of inputting or generating information that may be presented to the user as images, graphics, text or sound may be connected to the network 190, including, for example, computing systems used in the fields of ultrasound, angiography, nuclear medicine, radiography, endoscopy, pathology, dermatology, and the like.

Also connected to the network 190 may be the PACS 112 and/or another PACS workstation. The PACS 112 may be used for the storage, retrieval, distribution and presentation of images (such as those created and/or generated by the MRI scanner and/or CT Scanner). The medical images may be stored in an independent format, an open source format, or some other proprietary format. A common format for image storage in the PACS system is the Digital Imaging and Communications in Medicine (DICOM) format. In various embodiments, the stored images may be transmitted digitally via the PACS system, often reducing or eliminating the need for manually creating, filing, or transporting film jackets. Accordingly, as described, annotation data, medical images, and other image data may be stored by the image server 114 and/or the PACS 112.

The network 190 may also be connected to a Radiology Information System (RIS). In an embodiment, the radiology information system may be a computerized system that is used by radiology departments to store, manipulate and distribute patient radiological information.

Also attached to the network 190 may be an Electronic Medical Record (EMR) system. The EMR system may be configured to store and make accessible to a plurality of medical practitioners computerized medical records. Also attached to the network 190 may be a Laboratory Information System. In an embodiment, the Laboratory Information System may be a software system which stores information created or generated by clinical laboratories. Also attached to the network 190 may be a Digital Pathology System that may be used to digitally manage and store information related to medical pathology.

Also attached to the network 190 may be one or more Computer Aided Diagnosis Systems (CAD) systems that are generally used to perform Computer-Aided Processing (CAP) such as, for example, CAD processes. For example, in an embodiment the system may automatically process new 2D images that are associated with measurements and/or annotations from other previous 2D images, and adjust aspects of the measurements and/or annotations in view of new medical information from the new 2D images. In one embodiment, the CAD systems functionality may reside in a computing device separate from computing system 150 while in another embodiment the CAD systems functionality may reside within computing system 150.

Also attached to the network 190 may be one or more Processing Systems (such as the registration and matching processor 132, the 2D image generator 134, and/or other processing systems) that may be used to perform computerized advanced processing (CAP) such as, for example, the various processing described above including computations on imaging information to create new views of the information, for example, 3D volumetric display, Multiplanar Reformation/Reconstruction (MPR), and Maximum Intensity Projection reconstruction (MIP), as well as other types of processing, for example image enhancement, volume quantification, blood-flow quantification, and the like. In one embodiment, such processing functionality may reside in the registration and matching processor 132 and/or 2D image generator 134, while in another embodiment the processing functionality may reside within computing system 150.

In some embodiments, other computing devices that store, provide, acquire, and/or otherwise manipulate medical data may also be coupled to the network 190 and may be in communication with one or more of the devices illustrated in FIG. 1, such as with the computing system 150.

Depending on the embodiment, and as mentioned above, other devices discussed herein may include some or all of the same components discussed above with reference to the computing system 150, the registration and matching processor 132, and/or the 2D image generator 134, and may perform some or all of the functionality discussed herein.

VII. Additional Embodiments

Any process descriptions, elements, or actions in the flow diagrams described herein and/or depicted in the attached figures should be understood as potentially representing modules, segments, or portions of code which include one or more executable instructions (as described below) for implementing specific logical functions or actions in the process. Alternate implementations are included within the scope of the embodiments described herein in which elements or functions may be deleted, executed out of order from that shown or discussed, including substantially concurrently (for example, through multi-threaded processing, interrupt processing, or multiple processors or processor cores or on other parallel architectures) or in reverse order, depending on the functionality involved.

Any of the methods and processes described above may be partially or fully embodied in, and partially or fully automated via, logic instructions, software code instructions, and/or software code modules executed by one or more general purpose processors and/or application-specific processors (also referred to as "computer devices," "computing devices," "hardware computing devices," "hardware processors," and the like). For example, the methods described herein may be performed as software instructions are executed by, and/or in response to software instruction being executed by, one or more hardware processors and/or any other suitable computing devices. The software instructions and/or other executable code may be read from a tangible computer-readable medium. A tangible computer-readable medium is a data storage device that can store data that is readable by a computer system and/or computing devices. Examples of computer-readable mediums include read-only memory (ROM), random-access memory (RAM), other volatile or non-volatile memory devices, DVD-ROMs, CD-ROMs, magnetic tape, flash drives, and/or optical data storage devices. Accordingly, a software module may reside in RAM memory, flash memory, ROM memory, EPROM memory, EEPROM memory, registers, hard disk, solid state drive, a removable disk, a CD-ROM, a DVD-ROM, and/or any other form of a tangible computer-readable storage medium.

Additionally, any of the methods and processes described above may be partially or fully embodied in, and partially or fully automated via, electronic hardware (for example, logic circuits, hardware processors, and/or the like). For example, the various illustrative logical blocks, methods, routines, and the like described in connection with the embodiments disclosed herein may be implemented as electronic hardware, computer software, or combinations of both. To illustrate this, various illustrative components, blocks, modules, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the disclosure.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computing system for processing medical imaging exams, the computing system comprising:
    a non-transitory computer readable medium storing one or more software modules including computer executable instructions; and
    one or more hardware processors in communication with the non-transitory computer readable medium and configured to execute the one or more software modules in order to cause the computing system to:
        receive a first medical exam including at least a 3D data set obtained by a medical imaging scanner, the first medical exam further including a first image series having a plurality of images, wherein the first image series is rendered from the 3D data set;
        access a rules database including a plurality of rules indicating criteria for identifying related medical exams;
        identify a first rule in the rules database associated with one or more characteristics of the first medical exam, the first rule including one or more first criteria for identifying a second medical exam for comparison with the first medical exam;
        identify the second medical exam based on the one or more first criteria of the first rule;
        access the second medical exam, the second medical exam including a second image series having a second plurality of images obtained by a medical imaging scanner;
        compare the first and second image series;
        determine, based on the comparison, that the first and second image series differ from one another with respect to at least scan planes associated with the respective first and second image series;
        in response to determining that the first and second image series differ from one another with respect to at least their respective scan planes, determine an adjustment to be made to the scan plane of the first image series such that, after the adjustment, the scan plane of the first image series matches the scan plane of the second image series;
        re-render, based on the adjustment, the first image series from the 3D data set of the first medical exam such that the scan plane of the re-rendered first image series matches the scan plane of the second image series;
        receive a selection of an image of the re-rendered first image series by a user;
        automatically determine an image of the second medical exam corresponding to the image of the first medical exam;
        automatically determine a type and location of an annotation in the image of the second medical exam;
        automatically add an indication of the annotation to the image of the re-rendered first image series in a location in the image of the re-rendered first image series corresponding to the location of the annotation in the image of the second medical exam, wherein the indication of the annotation is selected based on the type of the annotation; and
        provide the image of the re-rendered first image series, including the indication of the annotation, to a display device for display to the user.

2. A computing system for processing medical imaging exams, the computing system comprising:
    a non-transitory computer readable medium storing one or more software modules including computer executable instructions; and
    one or more hardware processors in communication with the non-transitory computer readable medium and configured to execute the one or more software modules in order to cause the computing system to:
        receive a first medical exam including at least a first image series having a plurality of images obtained by a medical imaging scanner;
        access a rules database including a plurality of rules indicating criteria for identifying related medical exams;
        identify a first rule in the rules database associated with one or more characteristics of the first medical exam, the first rule including one or more first criteria for identifying a second medical exam for comparison with the first medical exam;
        identify the second medical exam based on the one or more first criteria of the first rule;
        access the second medical exam, the second medical exam including a second image series having a second plurality of images obtained by a medical imaging scanner;
        compare the first and second image series;
        determine, based on the comparison, that the first and second image series differ from one another with respect to at least one image characteristic associated with both the first and second image series;
        determine an adjustment to be made to the at least one image characteristic associated with the first image series such that the at least one image characteristic associated with the first image series matches the at least one image characteristic associated with the second image series;

generate, based on application of the adjustment, one or more 2D images based on the first image series that include the at least one image characteristic associated with the second image series;

receive a selection of one of the generated 2D images;

determine a corresponding 2D image of the second image series;

determine a type and location of an annotation in the corresponding 2D image;

add an indication of the annotation to the one of the generated 2D images in a location in the one of the generated 2D images corresponding to the location of the annotation in the corresponding 2D image of the second image series, wherein the indication of the annotation is selected based on the determined type of the annotation in the corresponding 2D image; and provide at least one of the generated 2D images to a display device for display to a user.

3. The computing system of claim 2, wherein the at least one image characteristic comprises at least one of an image angle, an anatomical position, an image orientation, an image rotation, a field of view, a slice thickness, an image window, and image level, an image color map, an image opacity, or a DICOM frame of reference.

4. The computing system of claim 3, wherein the one or more hardware processors are configured to execute the one or more software modules in order to further cause the computing system to determine the adjustment to be made to the at least one image characteristic by at least:

in response to determining that the first and second image series are offset from another with respect to at least one of: the image angle, the anatomical position, or the image rotation:

in response to determining that there is an offset of the image angle between the first and second image series, determining an angle offset;

in response to determining that there is an offset of the image rotation between the first and second image series, determining a rotation offset; and in response to determining that there is an offset of the anatomical position between the first and second image series, determining a position offset.

5. The computing system of claim 4, wherein the one or more hardware processors are configured to execute the one or more software modules in order to further cause the computing system to generate the one or more 2D images by at least:

generating, based on application of the angle offset, the position offset, and/or the rotation offset, the one or more 2D images based on the first image series such that the one or more 2D images are not offset from the second image series and match at least one of an image angle, and anatomical position, or an image rotation of the second image series.

6. The computing system of claim 3, wherein the one or more hardware processors are configured to execute the one or more software modules in order to further cause the computing system to determine the adjustment by at least:

determining a common DICOM frame of reference for the first and second image series.

7. The computing system of claim 6, wherein the one or more hardware processors are configured to execute the one or more software modules in order to further cause the computing system to generate the one or more 2D images by at least:

generating, based on the determined common DICOM frame of reference, the one or more 2D images based on the first image series such that a DICOM frame of reference of the one or more 2D images match a DICOM frame of reference of the second image series.

8. The computing system of claim 2, wherein the one or more hardware processors are configured to execute the one or more software modules in order to further cause the computing system to:

receive a user input selecting the added indication; and convert the indication to a new annotation similar to the annotation in the corresponding 2D image of the second image series.

9. The computing system of claim 8, wherein the one or more hardware processors are configured to execute the one or more software modules in order to further cause the computing system to:

receive a user input modifying the new annotation; and store the modified new annotation.

10. The computing system of claim 2, wherein the annotation comprises at least one of: a label, a measurement, an outline, a graphic, an assessment, or a note.

11. The computing system of claim 2, wherein the one or more hardware processors are configured to execute the one or more software modules in order to further cause the computing system to:

automatically process the one of the generated 2D images, based at least in part on the type and location of the annotation, to determine a second annotation; and add the second annotation of the one of the generated 2D images.

12. The computing system of claim 2, wherein the one or more hardware processors are configured to execute the one or more software modules in order to further cause the computing system to:

determine, for the at least one of the generated 2D images, a matching 2D image of the second image series;

determine that the matching 2D image includes at least one annotation; and provide, to the user and via the display device, an indication of the at least one annotation.

13. The computing system of claim 12, wherein the one or more hardware processors are configured to execute the one or more software modules in order to further cause the computing system to provide the indication of the at least one annotation by at least:

providing the indication in a location adjacent to, but not overlapping displayed imaging data of, the at least one of the generated 2D images.

14. The computing system of claim 13, wherein the one or more hardware processors are configured to execute the one or more software modules in order to further cause the computing system to:

receive a first user input selecting the indication;

in response to the first user input, provide a second indication of the second image series;

receive a second user input selecting the second indication; and in response to the second user input, providing the matching 2D image for display adjacent to the at least one of the 2D images.

15. The computing system of claim 2, wherein the one or more hardware processors are configured to execute the one or more software modules in order to further cause the computing system to generate the one or more 2D images by at least:
  accessing 3D volumetric imaging data associated with the first image series;
  determining a coordinate system of the second image series based on the determined adjustment; and
  generating the one or more 2D images based on the 3D volumetric imaging data and the determined coordinate system via multiplanar reformation.

16. The computing system of claim 2, wherein the rules database further includes a second plurality of rules indicating criteria for identifying image series types for comparison, wherein the one or more hardware processors are configured to execute the one or more software modules in order to further cause the computing system to:
  identify a second rule in the rules database, the second rule including one or more second criteria for identifying an image series type for comparison;
  select, based on the second rule, the first image series from the first image series, wherein the first image series is of the image series type; and
  select, based on the second rule, the second image series from the second image series, wherein the second image series is of the image series type.

17. A computing system for processing medical image series, the computing system comprising:
  a non-transitory computer readable medium storing one or more software modules including computer executable instructions; and
  one or more hardware processors in communication with the non-transitory computer readable medium and configured to execute the one or more software modules in order to cause the computing system to:
    receive a first medical image series;
    access a first rule from a rules database, the first rule indicating that the first medical image series is to be matched with a second medical image series;
    access the second medical image series;
    compare the first and second medical image series;
    determine, based on the comparison, that the first and second medical image series differ from one another with respect to at least one image characteristic associated with both the first and second medical image series;
    determine an adjustment to be made to the at least one image characteristic associated with the first medical image series such that the at least one image characteristic associated with the first medical image series matches the at least one image characteristic associated with the second medical image series;
    generate, based on application of the adjustment, 2D images based on the first medical image series that match the second medical image series;
    determine a type and/or location of an annotation in a 2D image of the second medical exam;
    determine a corresponding 2D image of the generated 2D images;
    add an indication of the annotation to the corresponding 2D image in a location in the corresponding 2D image corresponding to the type and/or location of the annotation in the 2D image of the second medical image series, wherein the indication of the annotation is selected based on the type of the annotation; and
    provide the generated 2D images to a display device for display to a user.

18. The computing system of claim 17, wherein the first and second medical image series are both part of a same medical exam.

19. The computing system of claim 18, wherein the first medical image series includes pre-contrast images and the second medical image series includes post-contrast images.

20. A computing system for processing medical image series, the computing system comprising:
  a non-transitory computer readable medium storing one or more software modules including computer executable instructions; and
  one or more hardware processors in communication with the non-transitory computer readable medium and configured to execute the one or more software modules in order to cause the computing system to:
    receive a first medical image series;
    access a first rule from a rules database, the first rule indicating that the first medical image series is to be matched with a second medical image series;
    access the second medical image series;
    compare the first and second medical image series;
    determine, based on the comparison, common DICOM frames of reference between the first and second medical image series;
    determine a type and/or location of an annotation in a first image of the second medical image series;
    determine a second corresponding image of the first medical image series based on the common DICOM frame of reference;
    add an indication of the annotation to the second corresponding image in a location in the second corresponding image corresponding to the type and/or location of the annotation in the first image of the second medical image series, wherein the indication of the annotation is selected based on the type of the annotation; and
    provide images of at least one of the first or second medical image series to a display device for display to a user.

21. The computing system of claim 20, wherein the one or more hardware processors are further configured to execute the one or more software modules in order to cause the computing system to:
  receive a selection of the second corresponding image;
  provide the second corresponding image, including the indication of the annotation, to the display device for display to the user; and
  automatically provide the first image, including the annotation, to the display device for display to the user.

22. The computing system of claim 20, wherein the first and second medical image series are both part of a same medical exam.

23. The computing system of claim 22, wherein the first medical image series includes pre-contrast images and the second medical image series includes post-contrast images.

24. The computing system of claim 1, wherein the one or more hardware processors are configured to execute the one or more software modules in order to further cause the computing system to:
  receive a user input selecting the added indication; and
  convert the indication to a new annotation similar to the annotation in the image of the second medical exam.

* * * * *